United States Patent
Singh et al.

(10) Patent No.: US 10,039,148 B2
(45) Date of Patent: Jul. 31, 2018

(54) APPLICATION-AWARE MULTIPLE WIRELESS RADIO-ACCESS TECHNOLOGY COEXISTENCE SOLUTION AND TIME SHARING BETWEEN MULTIPLE RADIO-ACCESS TECHNOLOGIES FOR IN-DEVICE COEXISTENCE

(71) Applicant: Apple Inc., Cupertino, CA (US)

(72) Inventors: Ajoy K. Singh, Milpitas, CA (US); Paul V. Flynn, Menlo Park, CA (US); Wen Zhao, San Jose, CA (US); Sami M. Almalfouh, San Jose, CA (US); Sanil H. Fulani, Milpitas, CA (US); William S. Burchill, San Jose, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 14/868,288

(22) Filed: Sep. 28, 2015

(65) Prior Publication Data
US 2016/0174280 A1 Jun. 16, 2016

Related U.S. Application Data

(60) Provisional application No. 62/091,449, filed on Dec. 12, 2014, provisional application No. 62/172,165, filed on Jun. 7, 2015.

(51) Int. Cl.
*G01R 31/08* (2006.01)
*H04L 5/14* (2006.01)
(Continued)

(52) U.S. Cl.
CPC ......... *H04W 76/15* (2018.02); *H04W 76/025* (2013.01); *H04W 88/06* (2013.01)

(58) Field of Classification Search
CPC ...... H04W 92/02; H04W 92/18; H04W 76/34
See application file for complete search history.

(56) References Cited

U.S. PATENT DOCUMENTS

| 8,626,067 B2 | 1/2014 | Ko et al. |
| 2004/0072559 A1 | 4/2004 | Kakumaru et al. |

(Continued)

FOREIGN PATENT DOCUMENTS

| JP | 2013522985 | 6/2013 |
| JP | 2014523654 | 9/2014 |

(Continued)

OTHER PUBLICATIONS

Office Action for Japanese Patent Application No. 2015-243468, dated Nov. 18, 2016, pp. 1-9.

(Continued)

*Primary Examiner* — Faruk Hamza
*Assistant Examiner* — Abu-Sayeed Haque
(74) *Attorney, Agent, or Firm* — Meyertons Hood Kivlin Kowert & Goetzel, P.C.; Jeffrey C. Hood

(57) ABSTRACT

A user equipment (UE) device may be configured to effectively manage coexistence of multiple radio access technologies (RATs) on the device. Respective controllers responsible for at least partially managing wireless communications according to corresponding respective RATs may communicate to each other expected data transfer patterns that take place over their respective communications links, including application-specific data transfer patterns and data-transfer-mechanism-specific data transfer patterns. The RAT controllers may manage their respective data transfers according to the expected data-transfer pattern information associated with the other RATs received from each in order to prevent data transmission by the device over one RAT link interfering with data transmission of the device over another (Continued)

RAT link. The expected data pattern information may be sent in messaging of a specific type with indexes determined based at least on a status of the data transfer mechanism and a connectivity status of the UE device.

20 Claims, 15 Drawing Sheets

(51) Int. Cl.
    *H04L 12/28*     (2006.01)
    *H04J 3/00*     (2006.01)
    *H04W 76/15*     (2018.01)
    *H04W 76/02*     (2009.01)
    *H04W 88/06*     (2009.01)

(56) References Cited

U.S. PATENT DOCUMENTS

| | | | | |
|---|---|---|---|---|
| 2010/0020773 A1* | 1/2010 | Jechoux | H04W 52/0216 | 370/338 |
| 2010/0232380 A1* | 9/2010 | Choi | H04W 72/082 | 370/329 |
| 2012/0046000 A1* | 2/2012 | Gao | H04W 72/02 | 455/73 |
| 2012/0294173 A1* | 11/2012 | Su | H04W 24/10 | 370/252 |
| 2012/0327913 A1* | 12/2012 | Wang | H04W 72/1215 | 370/336 |
| 2013/0107867 A1 | 5/2013 | Li et al. | | |
| 2013/0310045 A1* | 11/2013 | Yan | H04B 7/0608 | 455/437 |
| 2013/0343236 A1 | 12/2013 | Chen et al. | | |
| 2014/0056277 A1* | 2/2014 | HomChaudhuri | H04W 72/1257 | 370/330 |
| 2014/0120969 A1* | 5/2014 | Sang | H04W 72/1215 | 455/501 |
| 2014/0153547 A1 | 6/2014 | Klingenbrunn et al. | | |
| 2014/0211766 A1 | 7/2014 | Zhao et al. | | |
| 2014/0370892 A1* | 12/2014 | Gottimukkala | H04W 60/005 | 455/435.1 |
| 2015/0092673 A1 | 4/2015 | Singh et al. | | |
| 2015/0208310 A1* | 7/2015 | Taneja | H04W 36/0066 | 370/331 |
| 2015/0230286 A1 | 8/2015 | Feuersaenger et al. | | |
| 2015/0334575 A1* | 11/2015 | Joshi | H04W 72/0453 | 370/329 |

FOREIGN PATENT DOCUMENTS

| | | |
|---|---|---|
| WO | 2008/032750 | 3/2008 |
| WO | 2012-093349 | 7/2012 |

OTHER PUBLICATIONS

Office Action for Japanese Patent Application No. 2015-243468, dated Sep. 4, 2017, 3 pages.

\* cited by examiner

Numbers refer to values given in MHz

APPLICATION-AWARE MULTIPLE WIRELESS RADIO-ACCESS TECHNOLOGY COEXISTENCE SOLUTION AND TIME SHARING BETWEEN MULTIPLE RADIO-ACCESS TECHNOLOGIES FOR IN-DEVICE COEXISTENCE

PRIORITY CLAIM

This application claims benefit of priority of U.S. Provisional Patent Application Ser. No. 62/091,449 titled "Application-Aware Multiple Wireless Radio-Access Technology Coexistence Solution and Time Sharing Between Multiple Radio-Access Technologies for In-Device Coexistence", filed on Dec. 12, 2014, and further claims benefit of priority of U.S. Provisional Patent Application Ser. No. 62/172,165 titled "Application-Aware Multiple Wireless Radio-Access Technology Coexistence Solution and Time Sharing Between Multiple Radio-Access Technologies for In-Device Coexistence", filed on Jun. 7, 2015, both of which are hereby incorporated by reference as though fully and completely set forth herein.

FIELD OF THE INVENTION

The present application relates to wireless communication, and more particularly to application aware coexistence of different wireless radio access technologies, and time sharing between multiple radio-access technologies for in-device coexistence.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

User equipment devices (UEs) (e.g., mobile telephones or smart phones, portable gaming devices, laptops, wearable devices, PDAs, tablets, portable Internet devices, music players, data storage devices, or other handheld devices, etc.) may have multiple radio interfaces that enable support of multiple radio access technologies (RATs) as defined by the various wireless communication standards (LTE, LTE-A, Wi-Fi, BLUETOOTH™, etc.). The radio interfaces may be used by various applications and the presence of the multiple radio interfaces may necessitate the UE to implement mobility solutions to seamlessly run applications simultaneously over multiple radio interfaces (e.g., over LTE/LTE-A and BLUETOOTH™) without impacting the end-to-end performance of the application. That is, the UE may need to implement mobility solutions to simultaneously operate multiple radio interfaces corresponding to multiple RATs (e.g., LTE/LTE-A and BLUETOOTH™).

Many products, such as smartphones and tablets, for example, require multiple RAT interfaces with adjacent frequency bands to be active at the same time. For example, they may require cellular and BLUETOOTH™ and/or Wi-Fi links to be active at the same time, and two or more of these links may be operating in immediately adjacent bands. Because filters and amplifiers are not ideal, unwanted energy from each band spills over into the other band, causing interference, sometimes rendering certain bands unusable. This is a coexistence problem called "adjacent channel interference", or ACI for short. A particularly undesirable situation is when a UE transmits a powerful cellular signal, while at the same time it needs to also perceive a much weaker BLUETOOTH™ signal. Due to the spilled energy from the cellular signal the BLUETOOTH™ receiver is deafened (referred to as "receiver desense") causing errors and at times a complete loss of connection. For example, the upper portion of LTE Band 40 (also referred to herein as Band 40B) is very close to the 2.4 GHz ISM band. There is no guard band between LTE and Wi-Fi, and filters are typically not effective. Consequently, LTE is likely to desense Wi-Fi and Wi-Fi is likely to desense LTE. The problem may also occur with LTE Band 41, which has a small guard band with the ISM band. Guard bands and hardware filters are not considered to be effective in providing solutions that address the various problems stemming from ACI.

Therefore, improvements in the field would be desirable.

SUMMARY OF THE INVENTION

Embodiments are presented herein of, inter alia, application aware multiple wireless radio access technology (RAT) coexistence solutions corresponding to wireless networks, e.g. packet data networks, and of devices that implement the methods. Embodiments are further presented herein for time sharing solutions between different RATs for in-device coexistence.

Application-Aware Multiple Wireless RAT Coexistence

In order to address the multiple RAT coexistence (COEX) issue, Wireless Fidelity (Wi-Fi) circuitry and Long Term Evolution (LTE) circuitry (or Wi-Fi and LTE chips/integrated circuits) typically communicate over a dedicated link also known as Wireless Coexistence Interface, or Wi-Fi Cellular Interface (WCI for short), to co-ordinate the transmission of cellular and Wi-Fi radio signals. For example, when a Wi-Fi chip is trying to receive high-priority packets, it transmits a message advising the LTE chip (circuitry) that Wi-Fi reception requires protection from LTE transmission. Similarly, a cellular radio chip (circuitry) also notifies the Wi-Fi chip when it intends to send uplink data. Currently, cellular chips use a specific base station uplink grant, e.g. eNodeB (E-UTRAN node B or Evolved node B) uplink grant, to determine when to transmit user data in an uplink. Since a cellular chip uses the uplink grant from a base station to trigger COEX notification to Wi-Fi, it cannot provide uplink transmit (TX) information sufficiently ahead of time to the Wi-Fi chip. It is therefore possible that a Wi-Fi COEX mitigation algorithm might not have enough time to react to a trigger from the cellular chip. This makes existing COEX solution less effective.

In order to provide improvements over existing systems, application aware COEX algorithms may be implemented to provide a better COEX solution. It should be noted at this time that "COEX solution" is used as shorthand to denote a solution for the coexistence of different wireless radio access technologies, for example the coexistence of LTE (or more broadly, cellular radio) and Wi-Fi, or the coexistence of cellular radio and BLUETOOTH™, and so on and so forth.

In one set of embodiments, rather than using a real-time trigger such as uplink grant from a base station, application knowledge may be used in implementing a COEX algorithm. The COEX algorithm may first identify a primary application that is active on a wireless link. Applications that follow certain traffic patterns (e.g., FaceTime, Voice over LTE or VoLTE, Video Calling, etc.) may be considered primary applications. By being aware of the application type, the COEX algorithm may predict the nature of uplink traffic that is generated by an active application. For example, a VoLTE client may transmit uplink traffic every 20 ms. Traffic of best-effort applications may be bundled along with traffic of primary applications to ensure that an overall uplink traffic pattern is maintained over a cellular link even for best-effort traffic generated by other applications. (Best-effort delivery typically describes a network service in which there is no guarantee of data delivery, quality of service level, or priority to users. Thus, best-effort delivery may be characterized by unspecified variable bit rate and delivery times depending on the current traffic load, in contrast to reliable delivery and a defined, continuous quality of service.)

The first RAT circuitry (e.g. cellular chip or circuitry) may inform the second RAT circuitry (e.g. Wi-Fi chip or circuitry) about the expected traffic pattern on the first RAT link (e.g. cellular link). The second RAT circuit (e.g. Wi-Fi chip) may notify the Access Point (AP) about the expected transmit (TX) pattern on the first RAT uplink (e.g. cellular uplink) sufficiently ahead of time, and thereby provide the AP sufficient time to invoke a downlink COEX mitigation algorithm.

In addition to using an application traffic pattern, the first RAT circuitry (e.g. cellular chip) may also utilize uplink scheduling mechanisms that are currently in place. For example, if a first RAT base station (e.g. eNodeB) is configured with a semi persistent scheduling (SPS) mechanism, the first RAT circuitry (e.g. cellular chip) may notify the second RAT circuitry (e.g. Wi-Fi chip) about the expected traffic pattern of SPS allocation that the second RAT circuitry (e.g. Wi-Fi chip) may use to initiate appropriate COEX mitigation techniques.

Further to the above, the user equipment (UE) may inform the first RAT base station (e.g. eNodeB) about the pattern of downlink traffic expected on the second RAT ling (e.g. Wi-Fi link), which allows the second RAT base station (e.g. LTE eNodeB) to make uplink scheduling decisions more deterministically, which helps with avoiding COEX issues specially related to non-real-time applications. When non-real-time applications are active on the first RAT link (e.g. cellular link), the UE may request the first RAT base station (e.g. eNodeB) using MAC layer signaling to delay the uplink scheduling decision by a predetermined amount of time, i.e. by a time period of specific duration, which enables the UE to prepare to address the COEX issue over the second RAT link (e.g. Wi-Fi link).

Time Sharing Between Multiple RATs for in-Device Coexistence

In one set of embodiments, the desense problem may also be solved by time sharing between the different coexisting RATs, e.g. time sharing between LTE and Wi-Fi. It may be ascertained what transmission/reception time duration ensures that a given RAT can maintain a desired (specified) throughput. In other words, a given RAT may have a target time duration during which transfer of data (UL and/or DL) using that RAT may take place. Similarly, at least one of the at least two "competing" RAT links may be operated to transfer data during certain periods of time while during other periods no data transfer takes place over that RAT. For example, LTE may be operated to function with or without connected mode DRX (C-DRX). Accordingly, the C-DRX on/off cycles may be used as a guide when available, and the C-DRX behavior may be mimicked in UL when C-DRX is not configured.

Time sharing may be based on a well-defined data transmission mechanism associated with at least one of the RATs, whereby the data transmission mechanism includes pre-defined periods of transmission and non-transmission. For example, as mentioned above, LTE and Wi-Fi time sharing may be implemented based on the LTE C-DRX cycle. A cellular controller may use the cell-ISM link (a WCI-2 interface, for example) to inform the ISM (e.g. a Wi-Fi chip) about its active periods. Based on that received information, the Wi-Fi controller may schedule transmission/reception of data over the Wi-Fi link. Thus, Wi-Fi may be active during time periods when LTE is inactive, and Wi-Fi may be inactive during time periods when LTE is active.

In one set of embodiments, during an initial ON period various data transfer may take place over LTE. Additional LTE data transfers may take place during an extended portion of the ON period. The remaining OFF period may be reserved for Wi-Fi data transmissions. However, during longer C-DRX cycles there may be instances when LTE again becomes active during the OFF period. Because LTE transmissions are under control of the network, no control on the UE side may be exerted completely during those intermittent periods of LTE reactivation during the C-DRX OFF period.

However, a somewhat more deterministic approach may include managing time sharing between the coexisting RAT controllers (multiple RAT TX/RX) according to assumed data transfer (i.e. TX/RX) taking place over the first RAT link, in this case over the LTE link. Overall, two different messages sent between the cellular controller and the ISM controller may be used for managing the time sharing. More specifically, in the case of LTE/Wi-Fi and WCI, two WCI-2 messages may be used by the cellular controller to communicate activity. A first message may indicate inactivity duration, and a second message may indicate the subframe in which transmission will begin. In some embodiments, the first message is a Standard Type 3 Inactivity Duration as defined by BLUETOOTH™ signaling, in which the cellular controller indicates to the ISM controller when it intends to go inactive and how long it intends to remain inactive. The second message may be a Proprietary Advance Notice message indicating the subframe in which transmission will begin.

As mentioned above, LTE activity may be extended subsequent to the initial ON period. Once LTE activity ends, LTE may begin suppressing UL scheduling requests for a configurable inactivity period, and send an indication of Inactivity Duration indicative of this inactivity period to the ISM controller, e.g. via WCI-2 signaling. Responsive to this message, the Wi-Fi may leave the power save state and begin transfer (TX/RX) of data over the Wi-Fi link. At the end of the inactivity period of LTE (which is the activity period of the Wi-Fi), the Wi-Fi may enter power save mode. Consequently, LTE may send scheduling request to the base station (e.g. eNodeB), beginning the active LTE period. Also, LTE may transmit to the Wi-Fi advance notice that transmission will begin at a specific (specified) point in time. At the end of the activity period, LTE (e.g. the cellular controller) may again begin suppressing UL scheduling requests for a configurable inactivity period, and send an indication of Inactivity Duration indicative of this inactivity period to the ISM controller, e.g. via WCI-2 signaling. Responsive to this message, the Wi-Fi may again leave the power save state and begin transfer (TX/RX) of data over the Wi-Fi link. At the end of the Wi-Fi activity period, Wi-Fi may again enter power save mode, and LTE may again transmit to the Wi-Fi (i.e. to the ISM controller) advance notice that transmission will begin at a specific (specified) point in time. This process is then repeated for all transmissions for improved in-device coexistence of multiple RATs.

In general, the first RAT controller (e.g. cellular controller) may use knowledge about the periodicity of the active applications to guide the scheduling of transmitting during the C-DRX OFF period. That is, the signaling to the ISM controller may be based at least on knowledge about the periodicity of applications using the data transmissions over the various wireless interfaces. When a well-defined periodic data transfer mechanism, e.g. C-DRX is not enabled, the UE may use a similar on/off scheduling approach, but without anchoring it to a C-DRX cycle. In that case it may "mimic" a C-DRX cycle, employing timing values and period lengths commensurate with C-DRX or similar predictable TX/RC patterns that allow for time sharing between communications (TX/RX) conducted over the multiple wireless RAT interfaces in the UE.

Additional Control in Time Sharing Between Multiple RATs for in-Device Coexistence As described above, time sharing may be managed using a first messaging or communication type from a first RAT controller (e.g. using Type 3 messaging from an LTE controller) responsive to a second messaging or communication type from a second RAT controller (e.g. Type 1 messaging from a Wi-Fi controller). In some embodiments, the time sharing may be managed according to multiple characteristics or parameters associated with or corresponding to a data transmission mechanism of defined data transfer periodicity governing data transfer over the first RAT link, e.g. parameters corresponding to C-DRX. In addition, the time sharing may further be managed taking into consideration a stat of the Radio Resource Control (RRC) connection. For example, time sharing may be managed based on the C-DRX configuration, e.g. status of C-DRX configuration, the C-DRX active period, the C-DRX inactive period, and the state of RRC or the RRC connection. By updating messaging in time sharing management for COEX by including C-DRX status as well as the state of the RRC connection, LTE Wi-Fi coexistence interference problems may be significantly reduced and/or eliminated by allowing time-defined transmission for Wi-Fi. In addition, Wi-Fi throughput may be greatly increased, and LTE performance may be significantly improved by protecting LTE reception from Wi-Fi transmissions.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
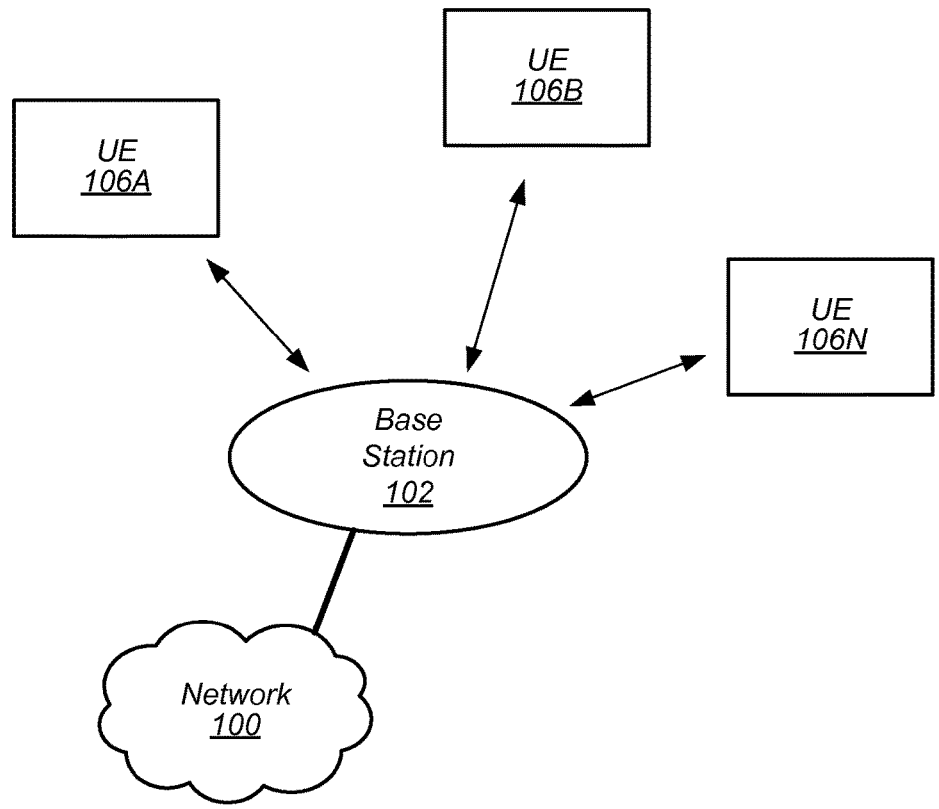
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
UE: User Equipment
RF: Radio Frequency
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
ISM (band): Industrial, Scientific, and Medical radio bands, which are portions of the radio spectrum reserved for the use of RF communications other than telecommunications (or other than "cellular communications")
TX: Transmission/Transmit
RX: Reception/Receive
UMTS: Universal Mobile Telecommunication System
LAN: Local Area Network
WLAN: Wireless LAN
AP: Access Point
APR: Applications Processor
APN: Access Point Name
GPRS: General Packet Radio Service
GTP: GPRS Tunneling Protocol
PDN: Packet Data Network
PGW: PDN Gateway
SGW: Serving Gateway
RAT: Radio Access Technology
Wi-Fi: Wireless Local Area Network (WLAN) RAT based on the Institute of Electrical and Electronics Engineers' (IEEE) 802.11 standards
Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
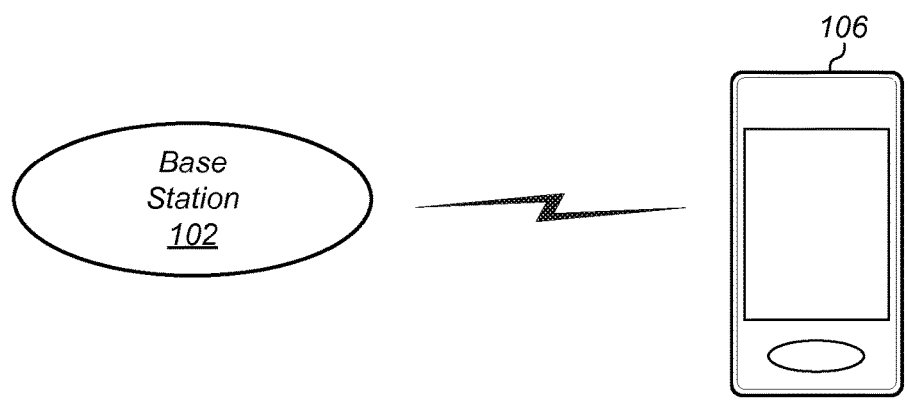
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved multiple RAT coexistence methods and time sharing between different RATs for in-device coexistence as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
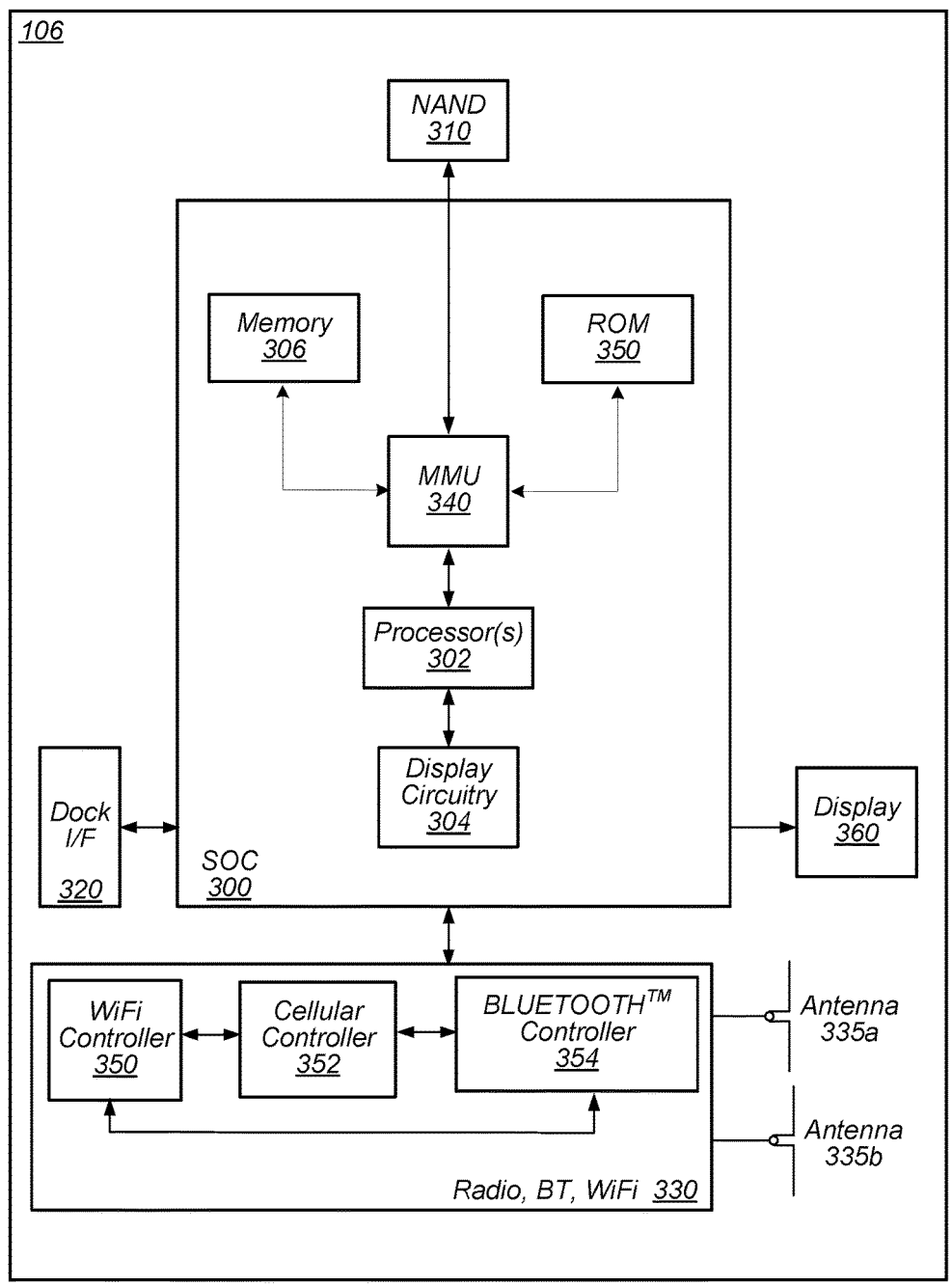
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTHTM, Wi Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include more antennas. Overall, the one or more antennas are collectively referred to as antenna 335. For example, the UE device 106 may use antenna 335 to perform the wireless communication with the aid of radio 330. As noted above, the UE may be configured to communicate wirelessly using multiple wireless communication standards in some embodiments.

As described further subsequently herein, the UE 106 (and base station 102) may include hardware and software components for implementing methods for optimized coexistence of multiple RATs on UE 106, and further implementing methods for time sharing between different RATs for in-device coexistence. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement optimized coexistence of multiple RATs for wireless communications using multiple RATs, and further to implement time sharing between different RATs for in-device coexistence according to various embodiments disclosed herein. Processor(s) 302 may also implement various other applications and/or end-user applications running on UE 106.

In some embodiments, radio 300 may include separate controllers dedicated to controlling communications for various respective RAT standards. For example, as shown in FIG. 3, radio 330 may include a Wi-Fi controller 350, a cellular controller (e.g. LTE controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302) as will be further described below. For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
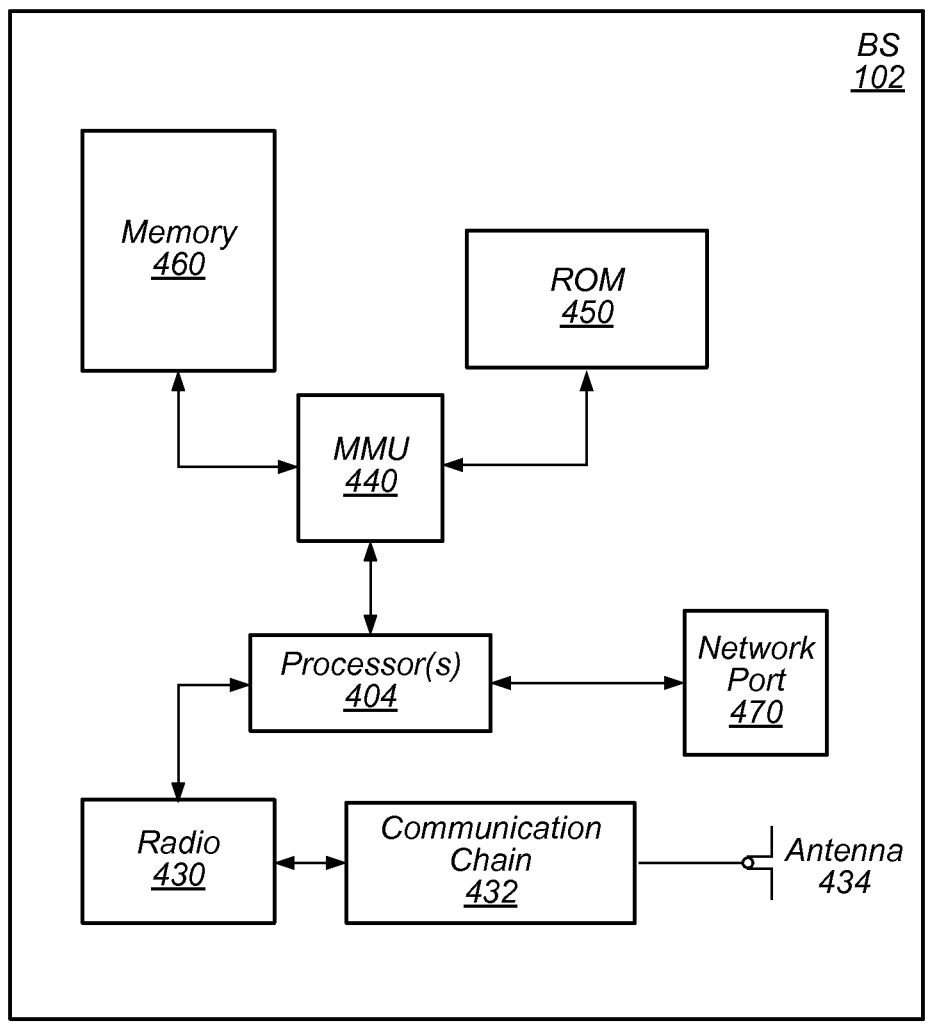
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein for improved CSFB handling, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods of application-aware multiple RAT coexistence solutions and time sharing between multiple RATs for in-device coexistence as disclosed herein.

Figure 5:
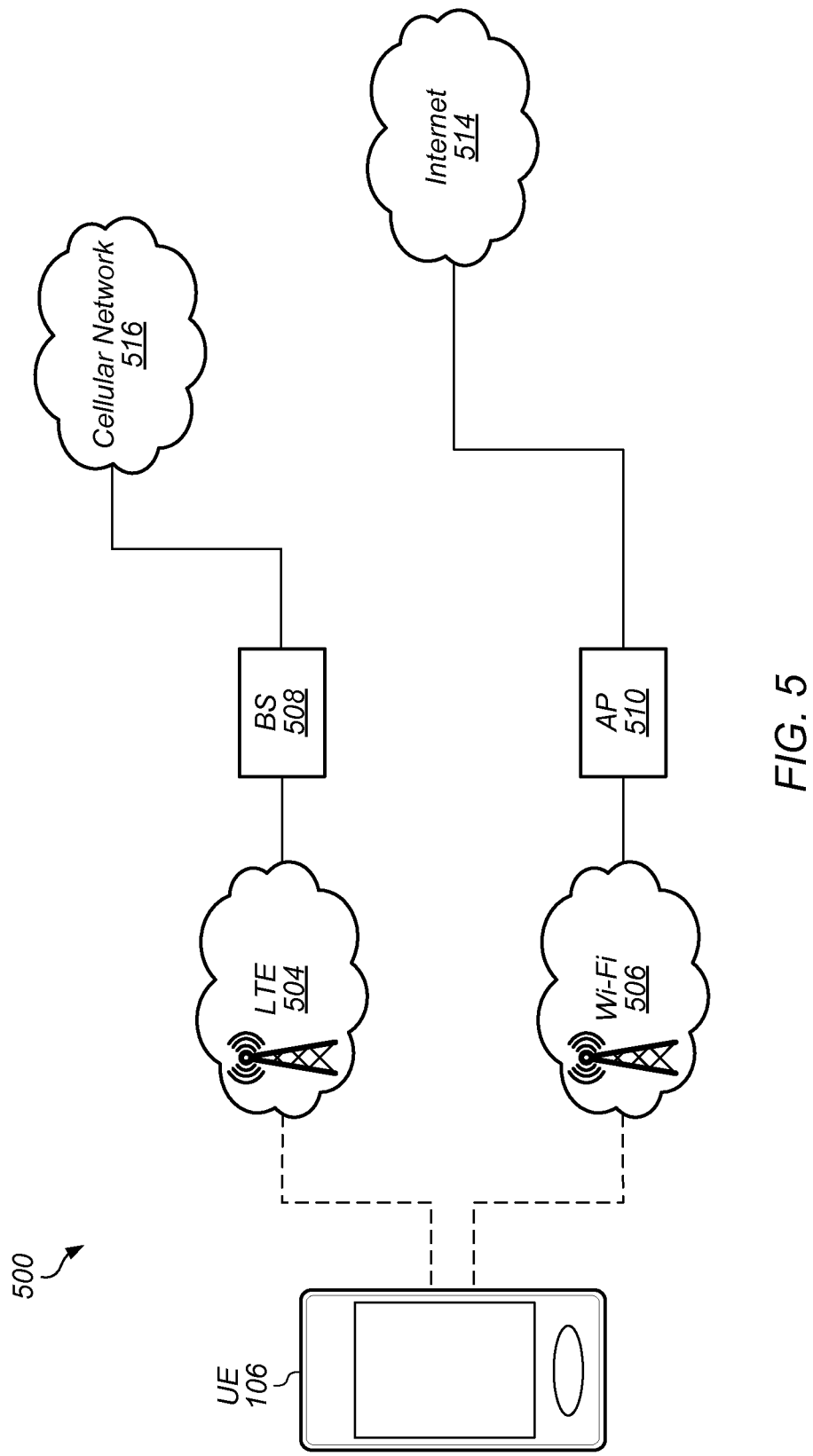
FIG. 5 illustrates an exemplary wireless communication system, according to some embodiments.

FIG. 5—Exemplary Communication System

FIG. 5 illustrates an exemplary wireless communication system 500 in accordance with some embodiments. System 500 is a system in which an LTE access network and a Wi-Fi radio access network are implemented. The system 500 may include UE 106 and LTE network 504 and Wi-Fi network 506.

LTE access network 504 is representative of some embodiments of a first RAT access and Wi-Fi access network 506 is representative of some embodiments of a second RAT access. LTE access network 504 may be interfaced with a broader cellular network (e.g. LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP), which may in turn provide access to the Internet 514. UE 106 may accordingly access Internet 514 via AP 510 and cellular network 516 via LTE access network 504. In some embodiments, though not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

FIG. 6—DRX

An example of a power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), WiMAX, etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE listens to the downlink (DL) packets following a specified pattern determined by the base-station (BS). In idle DRX (I-DRX) mode, the UE listens to the page from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

Another aspect of wireless data transmission is scheduling. In most cases, scheduling is fully dynamic. In a downlink direction, resources are assigned when data is available. For data to be sent in the uplink direction, the UE dynamically requests transmission opportunities whenever data arrives in the UE's uplink buffer. Information about data being sent in the downlink direction, and uplink transmission opportunities are carried in the radio layer control channel, which is sent at the beginning of each subframe. While dynamic scheduling is efficient for infrequent and bandwidth consuming data transmissions, which may result in large data bursts (e.g. web surfing, video streaming, emails), it is less suited for real time streaming applications such as voice calls. In the latter cases, data is sent in short bursts at regular intervals. If the data rate of the stream is very low, as is the case for voice calls, the overhead of the scheduling messages can become very high, as only little data is sent for each scheduling message.

One solution to this issue has been semi-persistent scheduling (SPS). Instead of scheduling each uplink or downlink transmission, a transmission pattern is defined instead of single opportunities. This significantly reduces the scheduling assignment overhead. During silence periods, the wireless voice CODECs in UEs stop transmitting voice data, and only send silence description information with much longer time intervals in between. During those times of silence the persistent scheduling can be switched-off. In the uplink, the SPS grant scheme is implicitly canceled if no data is sent for a network-configured number of empty uplink transmission opportunities. In downlink direction, SPS is canceled with an RRC (Radio Resource Control) message. The parameters for DRX cycles may be configured by the BS through different timers. The DRX inactivity timer indicates the time in number of consecutive subframes to wait before enabling DRX. Short DRX cycles and long DRX cycles are defined to allow the BS to adjust the DRX cycles based on the applications. In generation, a DRX short cycle timer may be defined to determine when to transition to the long DRX cycle. When there is no reception of packets for an extended period of time after the successful reception of a packet, the BS may initiate RRC connection release and the UE may enter the RRC IDLE state, during which the idle DRX can be enabled. The On-Duration timer may be used to determine the number of frames over which the UE will read the DL control channel every DRX cycle before entering power saving mode. The allowed values are 1, 2, 3, 4, 5, 6, 8, 10, 20, 30, 40, 50, 60, 80, 100, and 200. During idle DRX mode, the UE may monitor one paging occasion (PO) per DRX cycle, which is one subframe.

Figure 6:
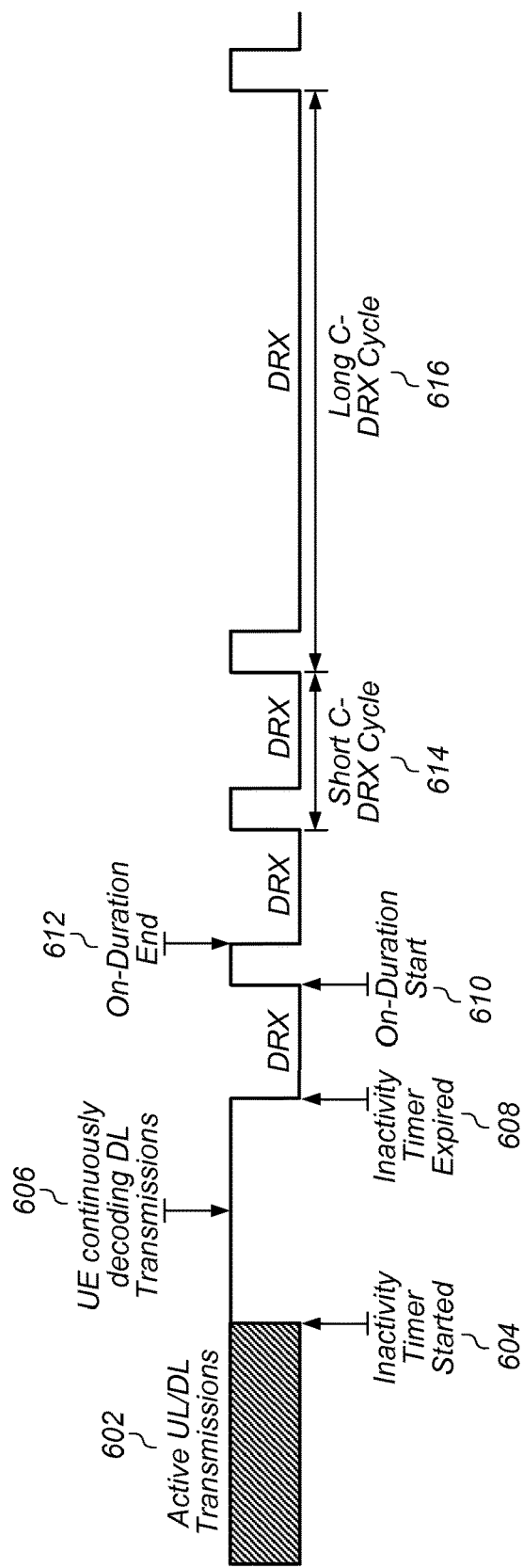
FIG. 6 is an exemplary timing diagram illustrating general operations of a C-DRX capable UE over a period of time, according to some embodiments.

FIG. 6 illustrates various aspects of general C-DRX operation, according to some embodiments. As indicated by 602, the UE 106 may operate in an active state and may perform one or more uplink and/or downlink (UL/DL) transmissions (e.g., transmit uplink data and/or receive downlink data). At 604, an inactivity timer may be initiated. The inactivity timer may be initiated at the end of the active transmissions in 602. Note that the inactivity timer may have been initiated one or more times during the active transmissions in 6502, but may have been reset each time as a result of continuing activity (transmissions) until no more activity was observed at 604, at which point it may run until expiration at 608. The inactivity timer may have any length, as desired; some examples of possible inactivity timer length might include 100 ms, 80 ms, 50 ms, 40 ms, or any other value, e.g., as specified by the 3GPP 36.331 specification.

In 606, between initiation (at 604) and expiration (at 608) of the inactivity timer, the UE 106 may not be performing any uplink or downlink transmissions, but may continue to operate in the active state, and may monitor one or more communication channels (e.g., a PDCCH) for downlink grants. At 608, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 610, the UE 106 may "wake-up" and re-enter the active state. The UE 106 may wake up at a time specified by a scheduler, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP 36.331 specification; alternatively, the on-duration may last until certain functions have been performed, and may end when no further specified functions need to be performed. At 612, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 614 (which may last 20 ms, 40 ms, 80 ms, or any other length of time), and if no uplink or downlink transmission are performed by the end of the pre-determined number of cycles, the UE 106 may perform one or more "long C-DRX" cycles 616 (which may last 80 ms, 160 ms, 320 ms, or any other length of time, e.g., as specified by 3GPP 36.331), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles.

If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

Coexistence of Multiple RATs

Figure 7:
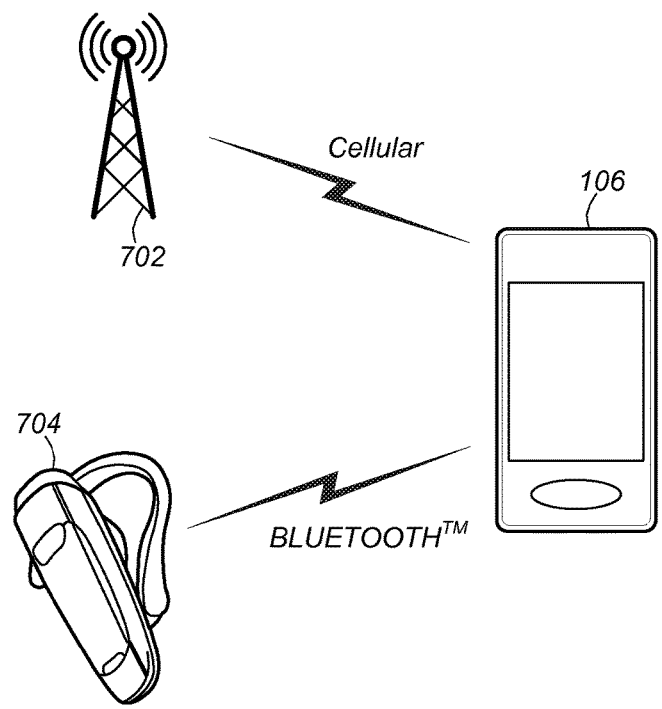
FIG. 7 illustrates an exemplary wireless UE device in communication with an exemplary cellular tower and an exemplary BLUETOOTH™ device, according to some embodiments.
Figure 8:
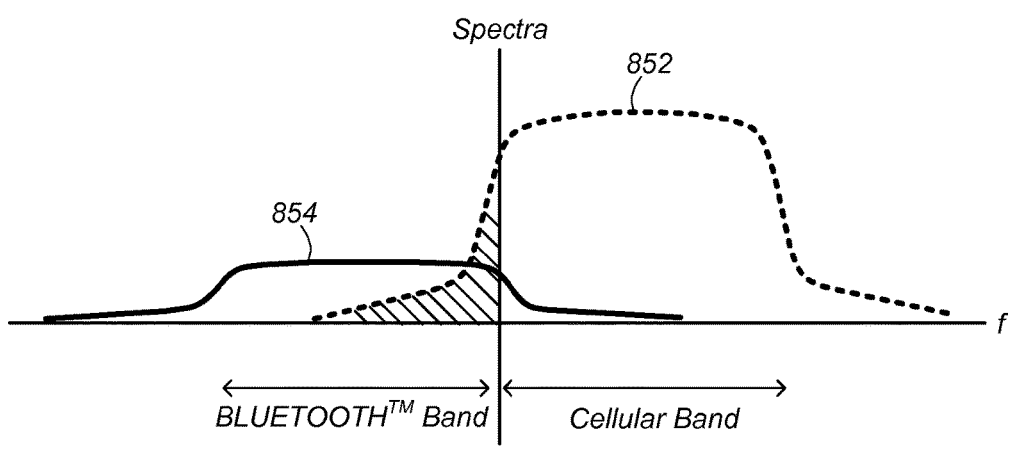
FIG. 8 illustrates exemplary energy bands with respect to communication frequency for BLUETOOTH™ and cellular radio access technology, according to some embodiments.

As previously mentioned, many products (e.g. mobile phones, tablets, etc.) may require both cellular and BLUETOOTH™ and/or Wi-Fi links to be active at the same time. This is illustrated in FIG. 7, where UE device 106 communicates with both a BLUETOOTH™ device 704 and a cellular base station 702. However, these different RATs may be in immediately adjacent bands as shown in FIG. 8. BLUETOOTH™ band 854 and cellular band 852 are adjacent, and because filters and amplifiers are not ideal, unwanted energy from each band spills into the other band, causing interference, sometimes making certain bands unusable. Referring again to FIG. 7, a particularly undesirable situation may arise when UE 106 transmits a powerful cellular signal, while at the same time it needs to also perceive a much weaker BLUETOOTH™ signal. Due to the spilled energy from the cellular signal (shown in FIG. 8 as the cross-shaded area), the BLUETOOTH™ receiver is deafened (referred to as receiver desense), which may cause errors, and sometimes even a complete loss of connectivity.

Figure 9:
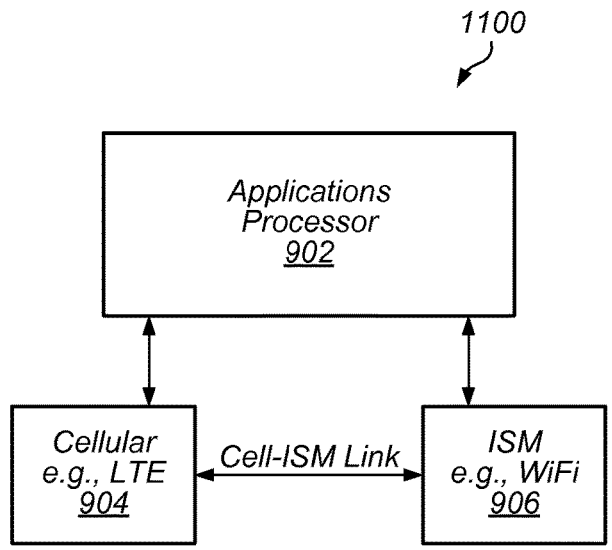
FIG. 9 shows a simple exemplary system diagram illustrating the interconnectivity of various radio controllers and an applications processor, according to some embodiments.

A very basic illustration of an exemplary general multiple RAT coexistence architecture according to some embodiments is shown in FIG. 9 (see also radio 330 in FIG. 3). Architecture 1100 may be representative of a portion of a UE device, containing at least two different types of radio controllers, e.g. a cellular (band) transceiver controller 904 and an ISM (band) transceiver controller 906. The ISM controller 906 may be for controlling Wi-Fi communications, BLUETOOTH™ communications or the like. In one embodiment, cellular controller 904 is an LTE chip (IC) and ISM controller 906 is a Wi-Fi chip. The operation of controllers 904 and 906 may be at least partially controlled by an Applications Processor (APR) 902. For example, APR 902 may instruct the LTE chip 904 to make a cellular call and at the same time instruct the Wi-Fi chip 906 to download a file on the ISM band. There is a link between the LTE chip 904 and Wi-Fi chip 906, which may be a cellular-ISM link allowing ICs 904 and 906 to communicate with each other.

Typically, when the Wi-Fi chip 906 is attempting to receive high priority packets, it may transmit a message over the cell-ISM link advising the LTE chip 904 that Wi-Fi reception requires protection from LTE transmission. Cellular chip 904 may also notify Wi-Fi chip 906 when it intends to transmit uplink data. Cellular chip 904 may use an eNodeB uplink grant to decide when it intends to send user data in an UL transmission. Cellular chip 904 may notify the Wi-Fi chip 906 of the UL TX subframe information as soon as possible so that the Wi-Fi AP (Wi-Fi access point) may co-ordinate the Wi-Fi DL transmission accordingly.

Since cellular chip 904 uses UL grant to trigger COEX notification to Wi-Fi chip 906, it cannot provide UL TX information sufficiently ahead of time to Wi-Fi chip 906. Therefore, it is possible that a Wi-Fi COEX mitigation algorithm might not have enough time to react to the trigger from cellular chip 904. This makes existing COEX solutions less effective. Device Wi-Fi chip 906 may be expected to initiate some of the following actions after receiving a trigger from cellular chip 904 to avoid interfering with UL cellular traffic:

Cts2Self (Clear to Send to Self), which would prevent the AP (e.g. AP 510 in FIG. 5) from sending downlink packets to STA.

Send 802.11v co-located interface report to AP. Such 802.11v-based explicit signaling may indicate to the AP when the UE intends to send UL packets over the cellular link, facilitating the AP's coordinating its DL transmission to avoid the COEX issue. This has not yet been widely implemented at the present time, however, due to lack of widespread deployment of 802.11v supported AP.

Overall, the Cts2Self mechanism requires the AP to stop transmitting DL data after receiving the Cts2Self notification from the Wi-Fi client, i.e. from Wi-Fi chip 906 within the UE. Some APs (referred to as leaky APs) are not able to react to Cts2Self messages in a real time fashion to prevent interference between a cellular UL and a Wi-Fi downlink. The mechanisms described above are real-time in nature. By the time the UE has informed the Wi-Fi, and Wi-Fi has informed the AP, the process may not successfully complete.

Application-Aware Coexistence of Multiple RATs

To mitigate the problems described above, various solutions may be implemented, as will be further described below. During certain applications, for example during a video call going through cellular (i.e. at least partially coordinated via cellular controller 904), or voice call, or any data communication taking place over the cellular network/interface, if the data application can be tracked, e.g. there is knowledge of packets going out every specified time period, then the Wi-Fi chip 906 may be notified of that information and Wi-Fi chip 906 may operate to accordingly schedule DL. Also, in case of SPS, for example, the cellular controller 904 may be aware of when it intends to transmit UL packets. Therefore, cellular chip 904 may convey/send that information to the Wi-Fi chip 906, and Wi-Fi chip 906 may inform the AP, through a Cts2self or an 802.11 mechanism for example, not to transmit the DL data.

There are also cases when it is desirable for Wi-Fi to be able to receive DL data, for example when it needs to receive a beacon signal. It is desirable for the Wi-Fi not to miss the beacon signal. Thus, if there is periodic Wi-Fi communication that Wi-Fi wishes to protect, Wi-Fi chip 906 may transmit the information pertaining to such communication to cellular chip 904, and cellular chip 904 may use this information to provide notification to the eNodeB (e.g. base station 508 in FIG. 5) of communication taking place over Wi-Fi, helping the eNodeB make decisions about when not to schedule UL communication from the UE.

Figure 10:
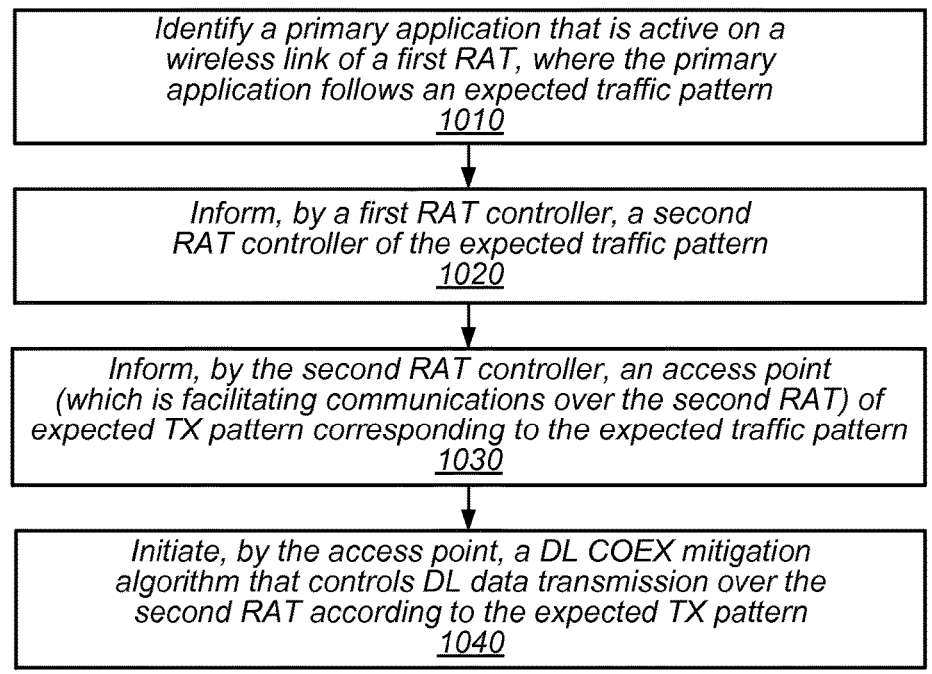
FIG. 10 shows a flowchart diagram illustrating an exemplary method for achieving application-aware multiple wireless RAT coexistence, according to a first set of embodiments.

FIG. 10 shows a flowchart diagram illustrating an exemplary method for achieving application-aware multiple wireless RAT coexistence in accordance with a first set of embodiments. The method shown in FIG. 10 may be implemented independently or in combination with any one of the methods shown in FIG. 11 and FIG. 12. A COEX algorithm may first identify a primary application that is active on a wireless link. Applications that follow certain traffic patterns (e.g., FaceTime, VoLTE, Video Calling, etc.) may be considered a primary application. In other words, applications following certain predictable and/or expected traffic patterns may be identified as a primary application (1010). By virtue of the awareness of the application type, the COEX algorithm may predict the nature of UL traffic that is generated by the active application. For example, a VoLTE client may send UL traffic every 20 ms. The traffic for best effort applications may be bundled along with traffic of the primary application to ensure that the overall UL traffic pattern is maintained over cellular link (i.e. the first RAT link) even for best effort traffic generated by other applications. The cellular chip (e.g. controller 904, or broadly the first RAT controller) may inform the Wi-Fi chip (e.g. ISM 906, or broadly the second RAT controller) over a WCI or cell-ISM link for example, of the expected traffic pattern (1020). The Wi-Fi chip (906) may notify the Wi-Fi AP about an expected TX pattern corresponding to the expected traffic pattern on a cellular UL sufficiently ahead of time (1030), thereby providing the Wi-Fi AP sufficient time to initiate a DL COEX mitigation algorithm that controls DL data transmission over the second RAT (i.e. over Wi-Fi link) according to the expected TX pattern (1040).

Figure 11:
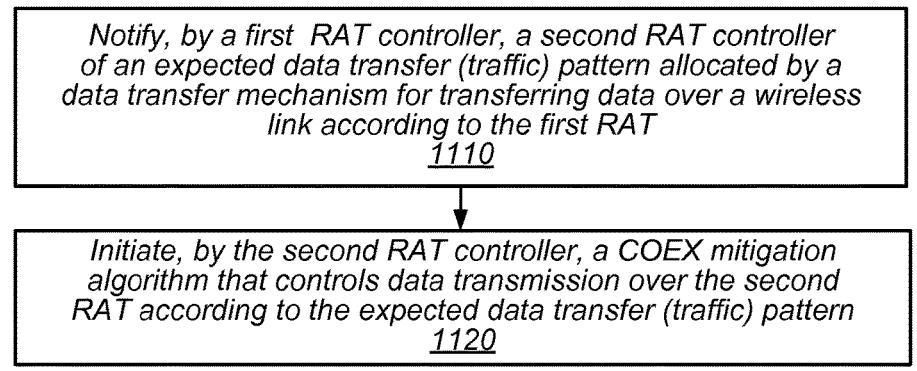
FIG. 11 shows a flowchart diagram illustrating an exemplary method for achieving application-aware multiple wireless RAT coexistence, according to a second set of embodiments.

FIG. 11 shows a flowchart diagram illustrating an exemplary method for achieving application-aware multiple wireless RAT coexistence in accordance with a second set of embodiments. Independently, or in combination with the method described above, the first RAT controller (e.g. cellular chip 904) may also utilize UL scheduling mechanisms that are currently in place to mitigate COEX. The method shown in FIG. 11 may be implemented independently or in combination with any one of the methods shown in FIG. 10 and FIG. 12. For example, if eNodeB is configured with a data transfer mechanism featuring predictable or expected traffic, such as an SPS mechanism for example, the first RAT controller (e.g. cellular chip 904) may notify the second RAT controller (e.g. Wi-Fi chip 906) of the expected traffic pattern allocated by the data transfer mechanism, e.g. according to the expected traffic pattern allocated by SPS (1110), and the second RAT controller (e.g. Wi-Fi chip 906) may use this notification to initiate a corresponding, appropriate COEX mitigation algorithm that controls data transmission over the second RAT (i.e. over Wi-Fi link) according to the expected traffic pattern (1120).

Figure 12:
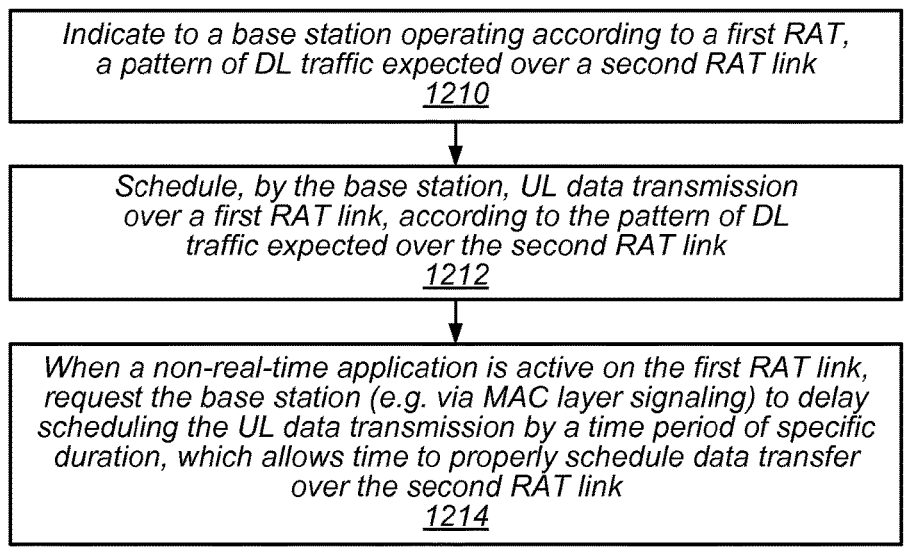
FIG. 12 shows a flowchart diagram illustrating an exemplary method for achieving application aware multiple wireless RAT coexistence, according to a third set of embodiments

FIG. 12 shows a flowchart diagram illustrating an exemplary method for achieving application-aware multiple wireless RAT coexistence in accordance with a third set of embodiments. Independently, or in combination with the methods described above, the UE may also use information about DL traffic patterns expected on Wi-Fi to mitigate COEX. The method shown in FIG. 12 may be implemented independently or in combination with any one or more of the methods shown in FIG. 10 and FIG. 11. The UE may indicate via the first RAT controller (e.g. cellular chip 904) to a corresponding base station (e.g. eNodeB) the pattern of DL traffic expected on the Wi-Fi link (1210). This allows the base station to make UL scheduling decisions more deterministically, which helps avoid COEX issues, especially for non-real-time applications (1212). Furthermore, when a non-real-time application is active on the cellular link, the UE may request the base station (e.g. eNodeB when the cellular link is LTE) using MAC layer signaling to delay the UL scheduling decision by a time period of specific duration so that the UE may prepare to address the COEX issue over the Wi-Fi link (1214).

It should be noted that in general the COEX solution is directed to control data transmissions over the various different RAT links in such a manner that no errors are caused by spilled energy from the more powerful signals of one RAT into less powerful signals of a second RAT. That is, expected data transfer patterns on either or all coexisting RAT links may be used to control and time data transfers over the multiple RAT links in a way that avoids concurrent signaling resulting in the more powerful signals of one RAT link desensing applications/devices using data transfer(s) over another, "weaker" RAT link. For example, in the embodiments discussed above, the cellular signal was considered to be more powerful than various ISM signals.

Figure 13:
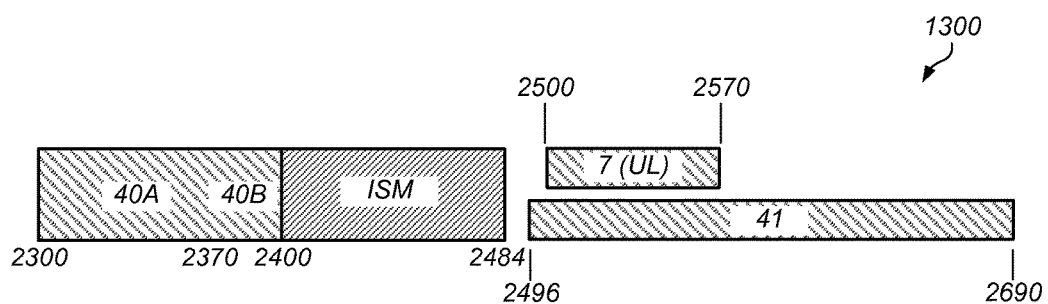
FIG. 13 shows an exemplary band diagram illustrating the relationship of LTE energy band 40B, the ISM energy band, and LTE energy band 41 with respect to each other, according to some embodiments.

Time Sharing Between Multiple RATs for in-Device Coexistence FIG. 13

Another aspect of the manner in which various bands of different RATs may affect each other according to some embodiments is illustrated in FIG. 13. The example in FIG. 13 illustrates energy bands for LTE and ISM (which may include Wi-Fi and BLUETOOTH™ as also previously described). As shown in FIG. 13, the upper portion of LTE Band 40 (referred to here as Band 40B) is very close to the 2.4 GHz ISM band. The values in FIG. 13 are provided in MHz. Accordingly, LTE Band 40A is shown extending from around 2.3 GHz to 2.37 GHz, and LTE Band 40B is shown extending from 2.37 GHz to 2.4 GHz, which is also where the ISM band begins and extends to 2.484 GHz. As seen in FIG. 13, no guard band exists between LTE and Wi-Fi (ISM). Filters have not proven to be effective in combating the adverse effects of the adjacency of these energy bands, and LTE is likely to desense Wi-Fi and Wi-Fi is likely to desense LTE. The problem may also occur with LTE Band 41, which extends from 2.496 GHz to 2.69 GHz and has a small guard band with the ISM band between 2.484 GHz and 2.496 GHz. It is therefore desirable to provide solutions not relying on guard bands or hardware filters.

In one set of embodiments, the desense problem may be solved by time sharing between the different coexisting RATs, e.g. time sharing between LTE and Wi-Fi. It may be ascertained what transmission/reception time duration ensures that a given RAT can maintain a desired (specified) throughput. In other words, a given RAT may have a target time duration during which transfer of data (UL and/or DL) using that RAT may take place. For example, Wi-Fi may need periods of at least 40 ms for transmitting and receiving to maintain a desired throughput. Similarly, at least one of the at least two "competing" RAT links may be operated to transfer data during certain periods of time while during other periods no data transfer takes place over that RAT. For example, LTE may be operated to function with and without connected mode DRX (C-DRX). The C-DRX on/off cycles may be used as a guide when available, and C-DRX behavior may be mimicked in UL when C-DRX is not configured.

FIG. 14

Figure 14:
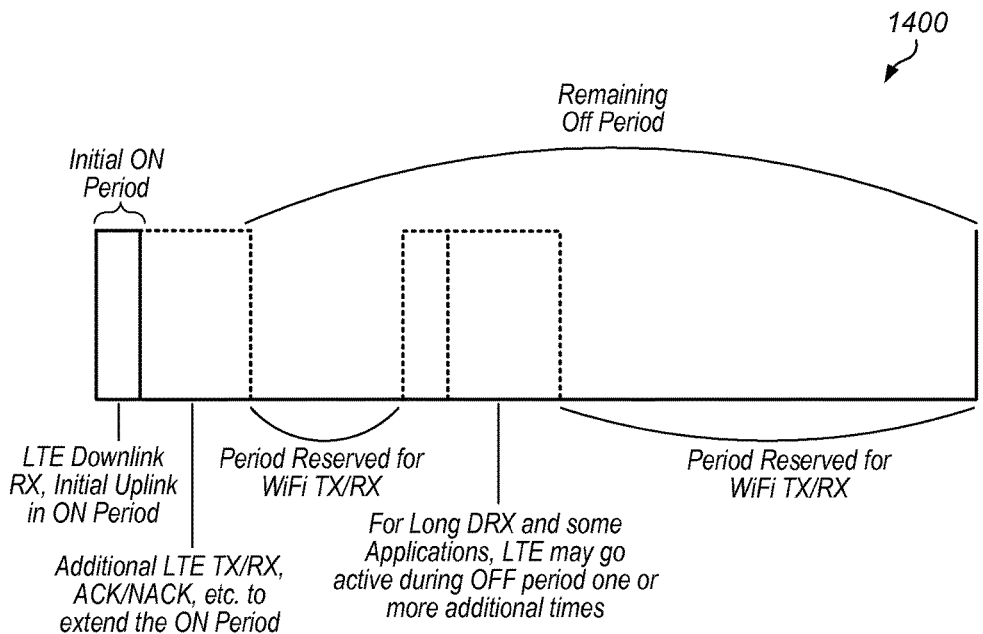
FIG. 14 shows an exemplary timing diagram illustrating time sharing between different RAT communications according to one set of embodiments.

FIG. 14 shows an exemplary diagram 1400 illustrating time sharing between different RAT communications according to some embodiments. As shown in FIG. 14, time sharing may be based on a well-defined data transmission mechanism associated with at least one of the RATs, whereby the data transmission mechanism includes predefined periods of transmission and non-transmission for that RAT. For example, in the example shown in FIG. 14, LTE and Wi-Fi time sharing is implemented based on the LTE C-DRX cycle. That is, the RAT with the well-defined data transmission mechanism in this case is LTE, which may time share transmission of data with Wi-Fi based on the well-defined data transmission mechanism. Referring to FIG. 9, by way of example, according to the time sharing principles introduced above, cellular controller 904 may use the cell-ISM link (which may be WCI-2 interface, for example) to inform ISM controller 906 (e.g. a Wi-Fi chip) about its active periods. Based on that received information, Wi-Fi controller 906 may schedule/effect transmission/reception of data over the Wi-Fi link. Thus, Wi-Fi may be active during time periods when LTE is inactive, and Wi-Fi may be inactive during time periods when LTE is active. In a way, Wi-Fi controller 906 may be considered a "slave" to LTE controller 904 regarding when to transfer data over the Wi-Fi link.

C-DRX may be configured in a couple of ways. In some cases it may be configured as a fairly long C-DRX cycle, e.g. 160 ms, whereas in other cases, e.g. for VoLTE applications, the C-DRX cycle may be shorter, e.g. 40 ms. Time sharing during a shorter cycle may be more straightforward than during a long cycle. Short cycles include alternating ON periods and OFF periods, and LTE remains silent during the OFF periods, making it possible to conduct Wi-Fi transmissions during the OFF periods. Therefore, while there may be guaranteed time periods for Wi-Fi transmission, those time periods may be of a shorter than desired duration. As illustrated in FIG. 14, during an initial ON period various data transfer may take place over LTE. Additional LTE data transfers may take place during an extended portion of the ON period. The remaining OFF period may then be reserved for Wi-Fi data transmissions. However, during longer C-DRX cycles there may be instances when LTE again becomes active during the OFF period, as indicated in FIG. 14, where following the first period reserved for Wi-Fi, LTE is shown to go active one or more additional times. The subsequent period, when LTE is again inactive, may also be reserved for Wi-Fi transmissions (TX/RX). It should be noted, however, that because LTE transmissions are under control of the network, no control on the UE side may be exerted completely during those intermittent periods of LTE reactivation during the C-DRX OFF period.

FIG. 15

Figure 15:
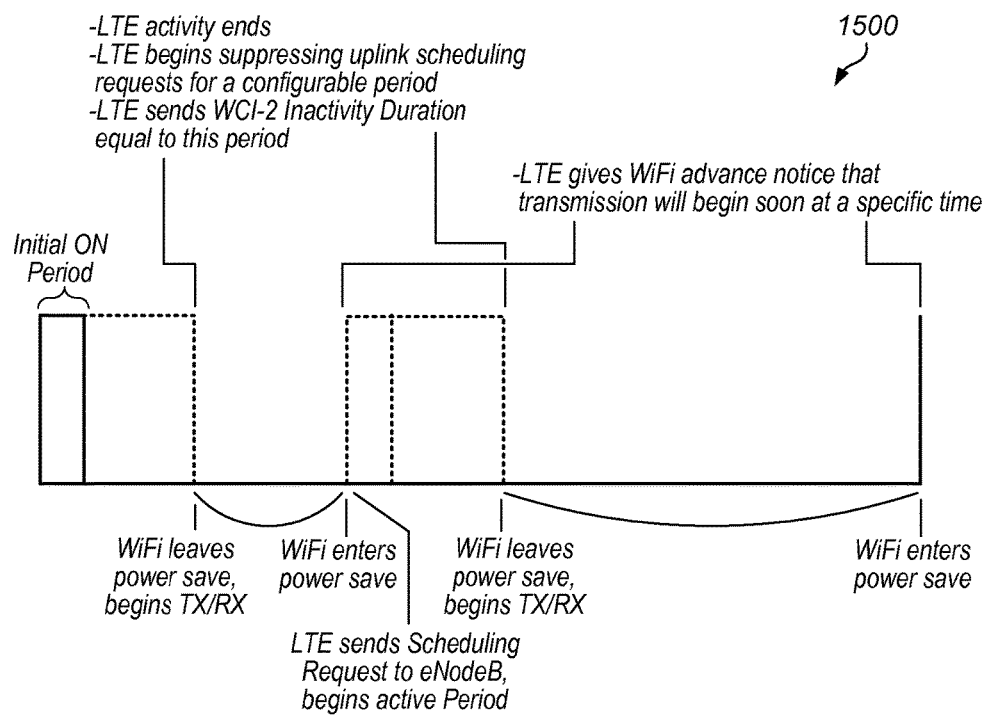
FIG. 15 shows an exemplary timing diagram illustrating time sharing between different RAT communications according to another set of embodiments.

A somewhat more deterministic approach in comparison to the one exemplified in FIG. 14 may include managing time sharing between the coexisting RAT controllers (multiple RAT TX/RX) according to assumed data transfer (i.e. TX/RX) taking place over the first RAT link, in this case over the LTE link. FIG. 15 shows an exemplary diagram 1500 illustrating time sharing between different RAT communications according to some embodiments, specifically, time sharing according to an assumed C-DRX mechanism. Overall, two different messages sent between cellular controller 904 and ISM controller 906 may be used for managing the time sharing. More specifically, in the case of LTE/Wi-Fi and WCI, two WCI-2 messages may be used by cellular controller 904 to communicate activity. A first message may indicate inactivity duration, and a second message may indicate the subframe in which transmission will begin. Specifically, the first message may be a Standard Type 3 Inactivity Duration as defined by BLUETOOTH™ signaling, in which cellular controller 904 may indicate to ISM controller 906 when it intends to go inactive and how long it intends to remain inactive. The second message may be a Proprietary Advance Notice message indicating the subframe in which transmission will begin.

As shown in FIG. 15, the LTE activity may be extended subsequent to the initial ON period. Once LTE activity ends, LTE (e.g. cellular controller 904) may begin suppressing UL scheduling requests for a configurable inactivity period, and send an indication of Inactivity Duration indicative of this inactivity period to the ISM controller 906, e.g. via WCI-2 signaling. Responsive to this message, the Wi-Fi (that is, the second RAT controller, in this case controller 906) may leave the power save state and begin transfer (TX/RX) of data over the Wi-Fi link (which is the second RAT link in this case). At the end of the inactivity period of LTE (which is the activity period of the Wi-Fi), the Wi-Fi may enter power save mode. Consequently, LTE may send scheduling request to the base station (e.g. eNodeB), beginning the active LTE period. Also, LTE (i.e. cellular controller 904) may transmit to the Wi-Fi (i.e. to the ISM controller 906) advance notice that transmission will begin at a specific (specified) point in time. At the end of the activity period, LTE (e.g. cellular controller 904) may again begin suppressing UL scheduling requests for a configurable inactivity period, and send an indication of Inactivity Duration indicative of this inactivity period to the ISM controller 906, e.g. via WCI-2 signaling. Responsive to this message, the Wi-Fi (that is, the second RAT controller, in this case controller 906) may again leave the power save state and begin transfer (TX/RX) of data over the Wi-Fi link. At the end of the Wi-Fi activity period, Wi-Fi may again enter power save mode, and LTE (i.e. cellular controller 904) may again transmit to the Wi-Fi (i.e. to the ISM controller 906) advance notice that transmission will begin at a specific (specified) point in time. This process is then repeated for all transmissions for improved in-device coexistence of multiple RATs.

In general, LTE, or more broadly, the first RAT controller (e.g. cellular controller 904) may use knowledge about the periodicity of the active applications to guide the scheduling of transmitting during the C-DRX OFF period. In other words, the signaling to the ISM controller may be based at least on knowledge about the periodicity of applications using the data transmissions over the various wireless interfaces. When a well-defined periodic data transfer mechanism, e.g. C-DRX is not enabled, the UE may use a similar on/off scheduling approach, but without anchoring it to a C-DRX cycle. In that case it may "mimic" a C-DRX cycle, employing timing values and period lengths commensurate with C-DRX or similar predictable TX/RC patterns that allow for time sharing between communications (TX/RX) conducted over the multiple wireless RAT interfaces in the UE. Examples of knowledge about the periodicity of active applications include VoLTE, which has a 40 ms cycle with voice frames occurring every 20 ms but bundled in pairs and transmitted every 40 ms, and FaceTime, where 20 ms voice frames are bundled in sets of three, scheduled to be transmitted every 60 ms, with video frames transmitted in pairs every 100 ms. Real-time applications tend to have a periodicity to them, which may be thus exploited.

FIG. 16

Figure 16:
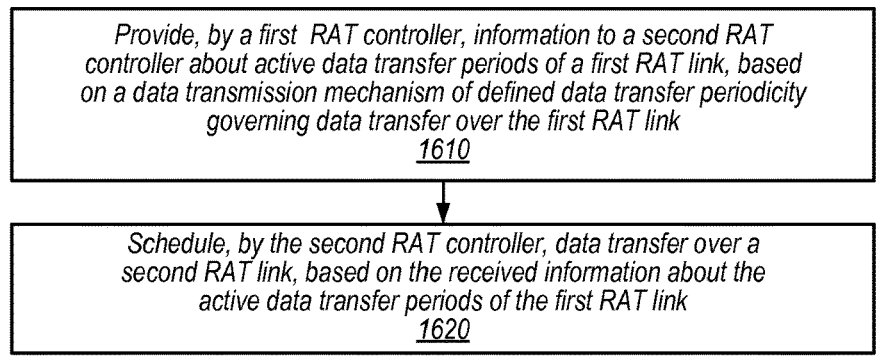
FIG. 16 shows a flowchart diagram illustrating an exemplary method for time sharing between different RAT communications according to a first set of embodiments.

FIG. 16 shows a flowchart diagram illustrating an exemplary method for time sharing between different RAT communications according to some embodiments. As shown in FIG. 16, a first RAT controller may provide to a second RAT controller information about active data transfer periods of the first RAT link, where the active data transfer periods are scheduled in accordance with a data transmission mechanism of defined data transfer periodicity governing the data transfer over the first RAT link (1610). Responsive to receiving the information, the second RAT controller may schedule data transfer over the second RAT link based on the received information about the active data transfer periods of the first RAT link (1620). Data transfer (TX/RX) over the second RAT link may therefore be active during time periods when data transfer over the first RAT link is inactive, and vice-versa.

FIG. 17

Figure 17:
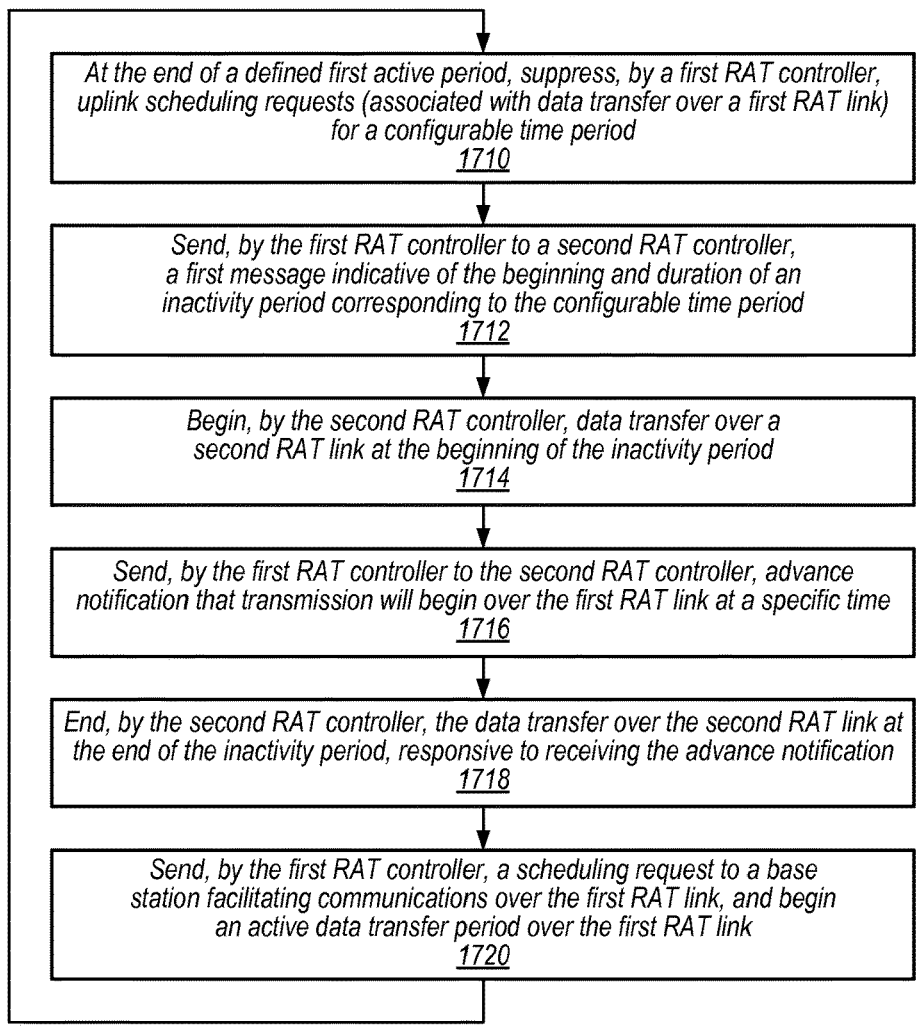
FIG. 17 shows a flowchart diagram illustrating an exemplary method for time sharing between different RAT communications according to a second set of embodiments.

FIG. 17 shows a flowchart diagram illustrating an exemplary method for time sharing between different RAT communications according to other embodiments. At the end of a defined first active period, a first RAT controller may suppress UL scheduling requests (associated with data transfer over the first RAT link) for a configurable time period (1710). The first RAT controller may send to a second RAT controller a first message indicative of the beginning and duration of an inactivity period corresponding to the configurable time period (1712). The second RAT controller may begin data transfer over the second RAT link at the beginning of the inactivity period (1714). The first RAT controller may send to the second RAT controller advance notification that transmission will begin over the first RAT link at a specific time (1716). The second RAT controller may then end the data transfer over the second RAT link at the end of the inactivity period, responsive to receiving the advance notification (1718). The first RAT controller may then send a scheduling request to a base station, and begin an active data transfer period over the first RAT link (1720).

Additional Embodiments

FIG. 18

Figure 18:
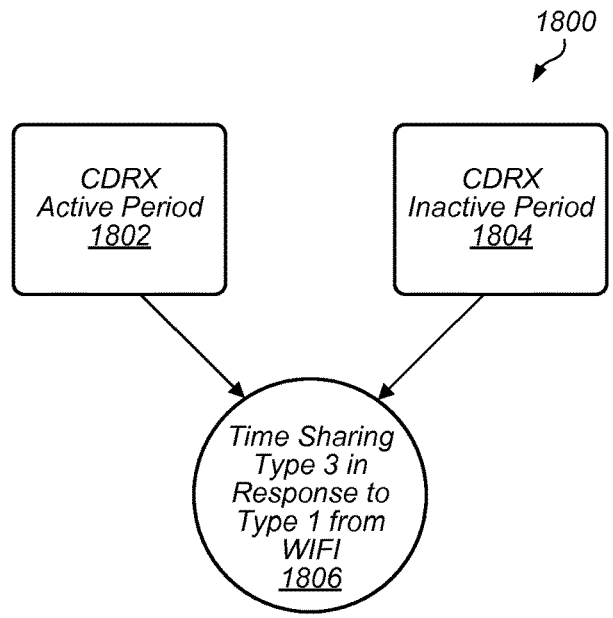
FIG. 18 shows an exemplary block diagram providing an overview of time sharing management between different RAT communications, according to some embodiments.

In reference to FIGS. 14 through 17, FIG. 18 provides a summary of the various embodiments in which time sharing between multiple RATs for in-device coexistence may take advantage of knowledge of active data transfer periods of a first RAT link, based on a data transmission mechanism of defined data transfer periodicity governing data transfer over the first RAT link. Specifically, FIG. 18 summarizes the approach exemplified in FIGS. 14 through 17, whereby knowledge of C-DRX active periods (1802) and C-DRX inactive periods (1804) may be used to manage time sharing through Type 3 communications from a first RAT (e.g. LTE) controller responsive to Type 1 communications from a second RAT (e.g. Wi-Fi) controller (1806). With respect to LTE and Wi-Fi representing the first RAT and second RAT, respectively, time sharing between LTE and Wi-Fi may be characterized as follows. The LTE controller may use the WCI-2 Interface to inform the Wi-Fi interface about its active periods. There is a start of the active period, an end of the active period, and a time duration until the next active period. Two WCI-2 messages may be used by the LTE controller to communicate activity. Type 3 communications may be indicative of standard inactivity duration as defined by the BLUETOOTH™ specification. An advance notice message may indicate the subframe in which transmission is to begin.

FIG. 19

Figure 19:
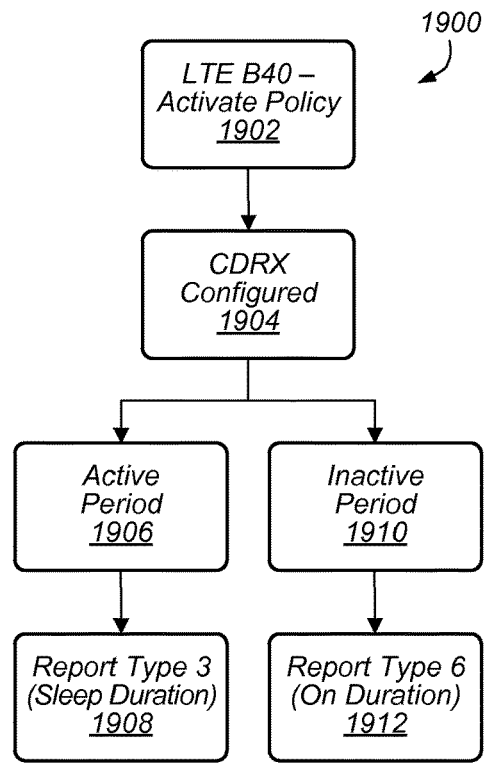
FIG. 19 shows an exemplary flow diagram illustrating the use of certain messaging types during management of time sharing between different RAT communications, according to some embodiments.

Corresponding to the above described characteristics, time sharing between LTE and Wi-Fi may be further described according to the flow summary illustrated in FIG. 19. An LTE B40 (band 40) policy is activated (1902), and C-DRX is configured (1904). When in an active period (1906), a Type 3 communication from the LTE controller may indicate the sleep duration, or duration of the sleep period (1908). When in an inactive period (1910), a Type 6 communication from the LTE controller may indicate the on duration, or duration of the on period (1912). More specifically, a C-DRX period may be reported from the LTE controller to the Wi-Fi controller in response to a Type 1 communication from the Wi-Fi controller. Whenever a Type 1 communication is received by the LTE controller from the Wi-Fi controller, the LTE controller sends a Type 3 communication to the Wi-Fi controller, indicating the remaining C-DRX active cycle on-period. The LTE controller uses the WCI-2 to send a Type 3 communication indicating the inactivity duration when it transitions from the C-DRX on-state to the C-DRX off-state. The LTE controller uses WCI-2 to send a Type 6 communication indicating an activity advance notice when it transitions from the C-DRX off-state to the C-DRX on-state.

Additional Features

With respect to the process flow described above, there may be additional issues to consider. A first issue may occur when C-DRX is not configured. There may not be enough information provided to the Wi-Fi controller when C-DRX is not configured or the configuration is bad (e.g., as described in more detail with reference to FIG. 21), adversely affecting the design flow exemplified in FIG. 19.

A second issue may occur when C-DRX is configured and the configuration is good (e.g., as described in more detail with reference to FIG. 21), but due to the inactivity timer never expiring (e.g. because of continuous data), the Wi-Fi may be off for a long duration until C-DRX goes into effect. While this is very unlikely to occur during VoLTE or burst-data transmissions, it may occur during connection-intensive traffic (e.g., FTP). Therefore, it may be desirable to protect LTE (using Type 3 communication with index 0), or allow LTE to operate on its own (using Type 3 communication with index 155).

A third issue may occur when a Type 1 communication from the Wi-Fi controller is received and there is no way of indicating to the Wi-Fi controller to continue its operation if LTE is asleep or C-DRX is not configured. In some embodiments, a Type 3 communication with specific index may be used for responding to Type 1 communication from the Wi-Fi controller, depending on the C-DRX cycle.

A fourth issue involves RRC connection request protection. In some cases the RRC connection establishment procedure may need to be protected when performing time sharing as described herein. In some embodiments, Type 3 communications (or messaging) may be used for protecting the RRC connection establishment. In order to protect the RRC connection, Type 3 and Type 6 messaging may be modified to take into consideration not only C-DRX on/off status but also the type of configuration for C-DRX and also RRC status. The RRC Connection may protected by transmitting Type 3 payload dependent on the cell conditions, such as the Reference Signal Received Power (RSRP) of the serving cell. The RRC connection request may be related to any covered event, for example a handover. Type 3 messaging may thereby be used to protect all RRC connection procedures.

FIG. 20

Figure 20:
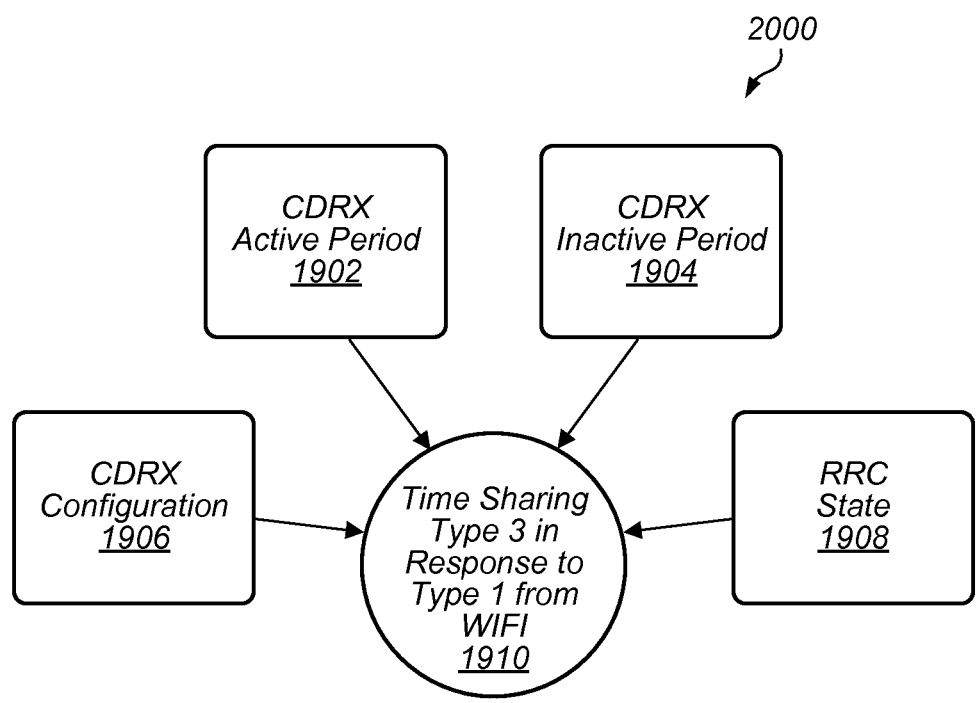
FIG. 20 shows an exemplary block diagram illustrating the parameters taken into account when managing time sharing between different RAT communications, according to some embodiments.

Pursuant to the above, an updated exemplary summary diagram of time sharing for multiple RAT COEX according to some embodiments is shown in FIG. 20. As shown in FIG. 20, at 1910, time sharing may be managed using a first messaging or communication type from a first RAT controller (e.g. using Type 3 messaging from an LTE controller) responsive to a second messaging or communication type from a second RAT controller (e.g. Type 1 messaging from a Wi-Fi controller). The time sharing may be managed according to multiple characteristics or parameters associated with or corresponding to a data transmission mechanism of defined data transfer periodicity governing data transfer over the first RAT link (e.g. parameters corresponding to C-DRX). For example, time sharing may be managed based on the C-DRX configuration, e.g. status of C-DRX configuration (1906), the C-DRX active period (1902), the C-DRX inactive period (1904), and the state of RRC or the RRC connection (1908). By updating messaging associated with time sharing management for COEX by including C-DRX status as well as the state of the RRC connection, LTE Wi-Fi coexistence interference problems may be significantly reduced and/or eliminated by allowing time-defined transmission for Wi-Fi. In addition, Wi-Fi throughput may be greatly increased, and LTE performance may be significantly improved by protecting LTE reception from Wi-Fi transmissions.

FIG. 21

Figure 21:
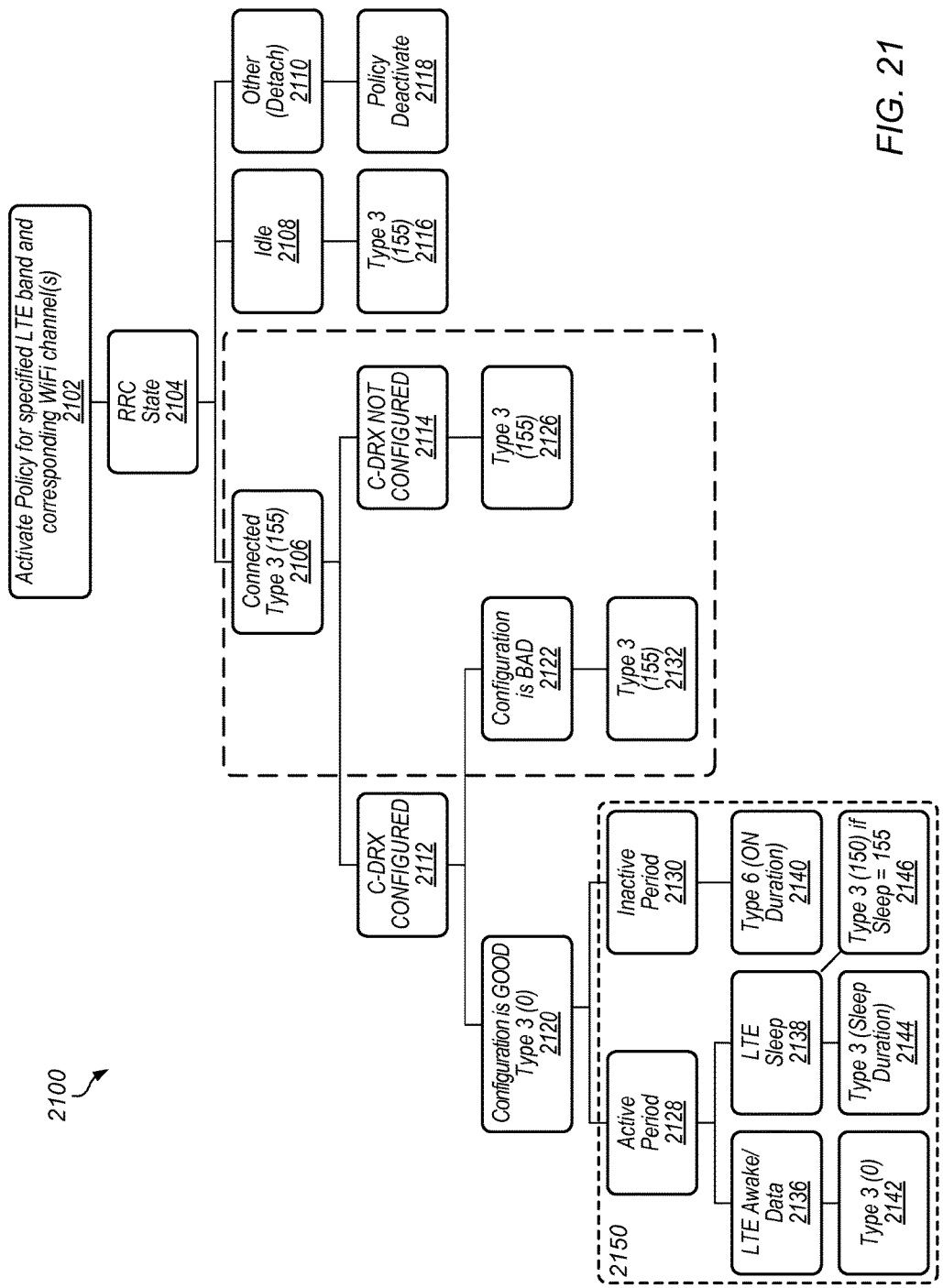
FIG. 21 shows an exemplary block diagram illustrating the use of certain messaging types during management of time sharing between different RAT communications, taking into account the parameters indicated in FIG. 20, according to some embodiments.

FIG. 21 shows a flow diagram illustrating an exemplary messaging structure illustrative of managing time sharing coexistence of different wireless radio access technologies, and time sharing between multiple radio-access technologies for in-device coexistence, according to one set of embodiments. At 2102, a policy (or data communications scheme) is activated for a specified frequency band associated with a first RAT and a corresponding channel or channels of a second RAT. For example, the policy may be activated for an LTE Band 40 (corresponding to the frequency range of 2300 MHz -2400 MHZ illustrated in FIG. 13) and corresponding Wi-Fi channels. It should be noted that while LTE Band 40 is referenced throughout herein, there are a few other potential bands where the time sharing policy may be activated. For example, in some embodiments the bands may be in the lower part of 800 MHz, such as LTE Bands 18, 20, and 27 having a third harmonic in the 2.4 GHz ISM band. It should also be noted that in general the policy may be activated for problematic frequencies in the first RAT band and corresponding channels/frequencies in the second RAT band. In general, problematic frequencies may be considered to be frequencies as previously described, for example with respect to FIG. 13.

At 2104, the state of the RRC connection may be determined. If the RRC connection state indicates a status other than an active connection or an idle connection (2110), for example an indication of no connection, the policy may be deactivated (2118). For example, for a variety of reasons the wireless device may have gone OOS (out of service), or may have reselected to another frequency (outside of the specified LTE band for which the policy was activated), or may have move to another RAT, resulting in the indication in 2110, which results in the policy being deactivated (2118). If the RRC connection state is indicative of an idle connection (2108), a first type of messaging with a specified index, e.g. Type 3 with index 155 may be used by a first RAT controller, e.g. LTE controller, to provide an indication to a second RAT controller, e.g. Wi-Fi controller (2116). Specifically, the Type 3 message with index 155 is indicative of the idle state, and the message may also be referred to as a Type 3 message with 155 duration.

If the RRC connection state is indicative of an active connection, Type 3 messaging with index (duration) 155 may be sent by the LTE controller (2106). If C-DRX is not configured (2114), Type 3 messaging with index 155 may be sent by the LTE controller (2126). If C-DRX is configured (2112), but the C-DRX configuration is bad (2122), the LTE controller may again send a Type 3 message with index 155 to the Wi-Fi controller (2132). Whether the configuration of C-DRX is good or bad may be defined as desired, based on a number of parameters and/or conditions. For example, a "GOOD" C-DRX configuration may correspond to a C-DRX on-duration that is less than a long C-DRX cycle duration, and a "BAD" configuration may therefore refer to all other conditions. In other embodiments, a "GOOD" or "BAD" configuration of C-DRX may similarly be defined as desired.

If C-DRX is configured (2112) and the configuration is "GOOD" (2120), the LTE controller may use Type 3 messaging with index 0 (2120). A "GOOD" C-DRX configuration may include two periods, an active period (2128) and an inactive period (2130). Overall, the LTE controller may use Type 3 messaging at the end of the active period/beginning of inactive period, and use Type 6 messaging at the end of the inactive period/beginning of active period. Overall, section 2150 of diagram 2100 may apply to two possible scenarios that may occur while in an active C-DRX period (2128). In a first scenario, the wireless device may be transitioning back and forth between active and inactive states (C-DRX On/Off) during LTE transmissions. In this scenario, the active period (2128) of the policy covers transitioning from and active state to inactive state, and at the end of the active period (2138) the LTE controller may send a Type 3 message with an indication of the estimated sleep duration (2144). On the other hand, when in the inactive period (2130), the LTE controller may send a Type 6 message with index 0 to the Wi-Fi controller to communicate the transition from inactive period to active period (2140). Specifically, the Type 6 message may be an advance notice to the Wi-Fi controller of a transition to active mode from inactive mode, with an indication of an upcoming on-duration. To put it another way, when the wireless device prepares to enter an on-period of LTE C-DRX transmission, the LTE controller may send a Type 6 message with an indication of when the on-period is beginning (2140). This indication may be the indication of a starting time or a starting point relative to some other event and/or transmission characteristic, for example an indication of a subframe at which the on-duration beings, or any other indication suitable to communicate when the on-period begins.

In a second scenario for section 2150, the LTE controller may respond to queries from the Wi-Fi controller when the Wi-Fi controller exits Wi-Fi sleep mode and queries the LTE controller to determine a present state of the LTE controller. Accordingly, the Wi-Fi controller may transmit a Type 1 message to the LTE controller (in some embodiments this references the Type 1 message defined by BLUETOOTH™ specification) and if the LTE controller is operating during the active period (2128), it may respond with a Type 3 message according to the three cases (2142, 2144, and 2146) as indicated. Specifically, when the Type 1 message is received during the active period and not at the end of the active period (2136), the LTE controller may respond with a Type 3 message with index 0 indicating to the Wi-Fi controller that it is awake (2142). If the query is received at the end of the active period (2138), the LTE controller sends a Type 3 message with an indication of the sleep duration (2144), or a Type 3 message with index 150 if the sleep duration exactly matches index 155, indicating to the Wi-Fi controller that it is asleep for an unlimited (e.g., undefined or infinite) duration. It should also be noted that the Type 3 message in response to the Type 1 message is not part of the BLUETOOTH™ specification, which only covers transmitting a Type 0 message (which describes LTE's real-time state, e.g. whether it is actively transmitting or receiving at that instant) in response to a Type 1 message.

Figure 22:
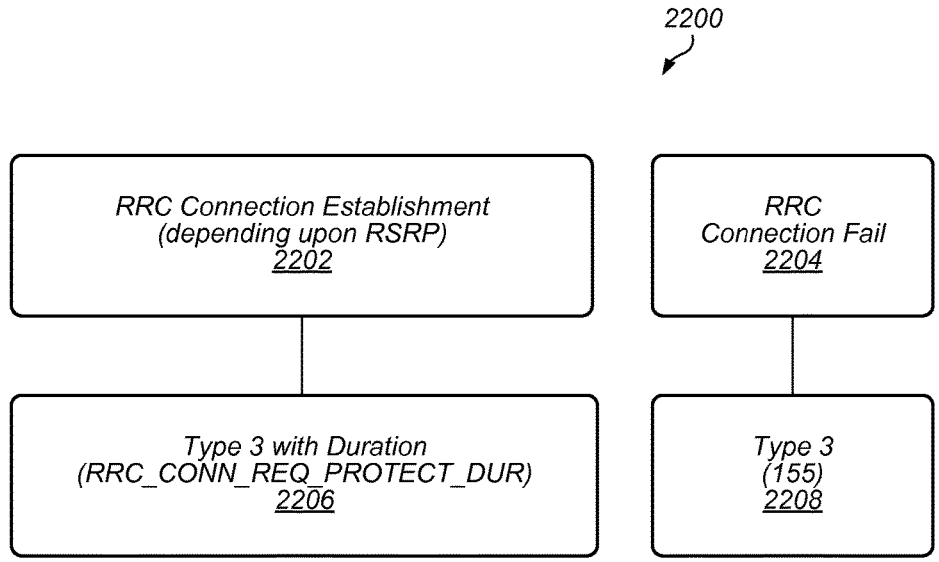
FIG. 22 shows an exemplary block diagram illustrating the use of certain messaging types during management of time sharing between different RAT communications to protect Radio Resource Control connection establishment, according to some embodiments.

FIG. 22 shows a block diagram 2200 illustrating the use of certain messaging types during management of time sharing between different RAT communications to specifically protect RRC connection establishment, according to some embodiments. As shown in FIG. 22, to establish an RRC connection dependent on Reference Signal Received Power (2202), Type 3 messaging with duration may be used by the LTE controller to communicate (2206). In case of an RRC connection fail (2204), the LTE controller may use Type 3 messaging with index 155 (2208), indicating to the Wi-Fi controller that it is asleep for an unlimited (e.g., undefined or infinite) duration.

FIG. 23

Figure 23:
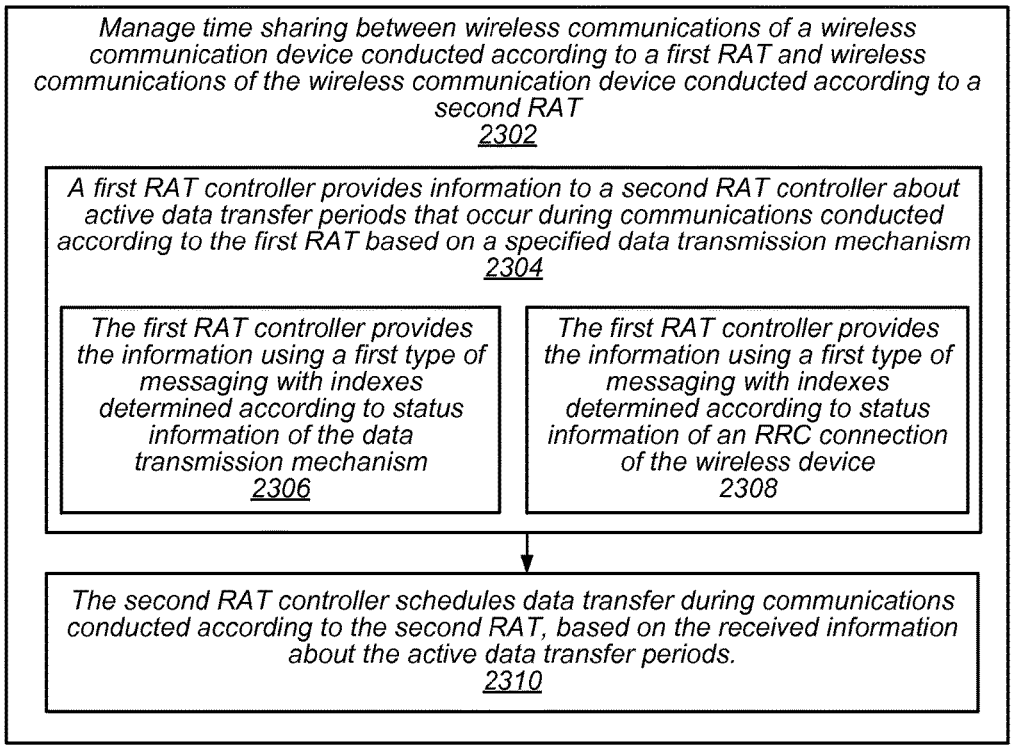
FIG. 23 shows an flow diagram of an exemplary method for managing time sharing between communications of a wireless device conducted over a first RAT link and communications of the wireless device over a second RAT link, according to some embodiments.

FIG. 23 shows a flow diagram illustrating time sharing between wireless communications conducted using at least two different RATs by a wireless communication device, according to some embodiments. At 2302, a wireless device manages time sharing between wireless communications of the wireless device conducted according to a first RAT and wireless communications of the wireless device conducted according to a second RAT. In some embodiments, the time sharing management includes a first RAT controller of the wireless device providing information to a second RAT controller of the wireless device about active data transfer periods that occur during communications conducted according to the first RAT based on the data transmission mechanism (2304). The first RAT controller manages wireless communications of the wireless device over a first radio link operated according to the first RAT, while the second RAT controller manages wireless communications of the wireless device on a second radio link operated according to the second RAT. In some embodiments, the first RAT is LTE while the second RAT is Wi-Fi.

In some embodiments, the information includes information about active data transfer periods that occur during communications conducted according to the first RAT based on a specified data transmission mechanism. For example, the information may include information about active data transfers over LTE operating in C-DRX mode, the C-DRX mode representing the specified data transmission mechanism. In other embodiments the specified data transmission mechanism may be a different data transfer mechanism having expected periodicity, for example.

Furthermore, the first RAT controller may provide the information using a first type of messaging with indexes determined according to status information of the specified data transmission mechanism (2306). For example, in case of C-DRX and LTE, the first RAT controller may use Type 3 messaging with the indexes determined according to the status of the C-DRX connection, as previously described above. In addition, the first RAT controller may also provide the information using a first type of messaging with indexes determined according to status information of a connection or connectivity of the wireless device (2308). For example, referring again to the case of LTE, the first RAT controller may use Type 3 messaging with the indexes determined according to an RRC connection/connectivity of the wireless device, as also previously described above. The second RAT controller may then schedule data transfer during communications conducted according to the second RAT, based on the received information about the active data transfer periods (2310).

Further Embodiments

In some embodiments, a UE device includes a radio having one or more antennas for performing wireless communication according to at least a first RAT and a second RAT. The UE also includes a first controller for at least partially managing wireless communication of the UE according to the first RAT, and a second controller for at least partially managing wireless communication of the UE according to the second RAT. The first controller may be operated to notify the second controller of an expected data transmission pattern allocated by a data transfer mechanism for transferring data according to the first RAT, and the second controller may be operated to initiate an algorithm that controls data transmission over the second RAT according to the expected data transmission pattern.

In some embodiments, a device includes means for providing notification of an expected data transmission pattern allocated by a data transfer mechanism for transferring data over a wireless link according to a RAT, and further includes means for initiating an algorithm that controls data transmission over a second RAT according to the expected data transmission pattern, responsive to receiving the notification.

In some embodiments, a non-transitory memory element (NME) may store instructions executable by processing circuitry to cause a mobile device to provide notification of an expected data transmission pattern allocated by a data transfer mechanism for transferring data over a wireless link according to a RAT. The instructions may further be executable by the processing circuitry to initiate an algorithm that controls data transmission over a second RAT according to the expected data transmission pattern, responsive to receiving the notification.

In some embodiments, a method for improved coexistence of multiple wireless RAT communications in a device includes identifying a primary application that is active on a wireless link of a first RAT (where the primary application follows an expected data transfer pattern on the wireless link of the first RAT), informing, by a first RAT controller, a second RAT controller of the expected data transfer pattern, informing, by the second RAT controller, an access point operating according to the second RAT, of an expected data transmit (TX) pattern corresponding to the expected data transfer pattern, and initiating, by the access point, an algorithm that controls downlink data transmission over a second RAT link according to the expected TX pattern.

In some embodiments, a UE device may include a radio having one or more antennas for performing wireless communication according to at least a first RAT and a second RAT. The UE device may also include a first controller for at least partially managing wireless communication of the UE according to the first RAT, and a second controller for at least partially managing wireless communication of the UE according to the second RAT. The UE may be operated to identify a primary application that is active on a wireless link of the first RAT, where the primary application follows an expected data transfer pattern on the wireless link of the first RAT. The first controller may operate to inform the second controller of the expected data transfer pattern, and the second controller may operate to inform an access point operating according to the second RAT, of an expected data transmit (TX) pattern corresponding to the expected data transfer pattern, where the access point operates to control downlink data transmission over a wireless link of the second RAT according to the expected TX pattern.

In some embodiments, a device includes means for identifying a primary application that is active on a wireless link of a first RAT, where the primary application follows an expected data transfer pattern on the wireless link of the first RAT. The device may also include means for providing first information indicative of the expected data transfer pattern, and means for providing second information indicative of an expected data transmit (TX) pattern corresponding to the expected data transfer pattern to an access point operating according to the second RAT, where the access point may operate to control downlink data transmission over a second RAT link according to the expected TX pattern.

In some embodiments, a non-transitory memory element (NME) may store instructions executable by processing circuitry to cause a mobile device to identify a primary application that is active on a wireless link of a first RAT, where the primary application follows an expected data transfer pattern on the wireless link of the first RAT, provide first information indicative of the expected data transfer pattern, and provide second information indicative of an expected data transmit (TX) pattern corresponding to the expected data transfer pattern to an access point operating according to the second RAT, where the access point may operate to control downlink data transmission over a second RAT link according to the expected TX pattern.

A method for improved coexistence of multiple wireless RAT communications in a device includes indicating to a base station operating according to a first RAT, a pattern of downlink traffic expected over a second RAT link. The method may also include scheduling, by the base station, uplink data transmissions over a first RAT link, according to the pattern of downlink traffic expected over the second RAT link, and requesting the base station, when a non-real-time application is active on the first RAT link, to delay scheduling the uplink data transmissions by a time period of specific duration.

In some embodiments, a UE device includes a radio having one or more antennas for performing wireless communication according to at least a first RAT and a second RAT, and further includes control circuitry that may operate to indicate to a base station operating according to the first RAT, a pattern of downlink traffic expected over a second RAT link, where the base station may operate to schedule uplink data transmissions over a first RAT link, according to the pattern of downlink traffic expected over the second RAT link. The control circuit may also operate to request the base station, when a non-real-time application is active on the first RAT link, to delay scheduling the uplink data transmissions by a time period of specific duration.

In some embodiments, a device includes means for indicating to a base station operating according to a first RAT, a pattern of downlink traffic expected over a second RAT link, wherein the base station operates to schedule uplink data transmissions over a first RAT link, according to the pattern of downlink traffic expected over the second RAT link. The device may also include means for requesting the base station, when a non-real-time application is active on the first RAT link, to delay scheduling the uplink data transmissions by a time period of specific duration.

In some embodiments, a non-transitory memory element (NME) stores instructions executable by processing circuitry to cause a wireless communication device to indicate to a base station operating according to a first radio access technology (RAT), a pattern of downlink traffic expected over a second RAT link, where the base station is configured to schedule uplink data transmissions over a first RAT link, according to the pattern of downlink traffic expected over the second RAT link. The instructions may further be executable to cause the wireless communication device to request the base station, when a non-real-time application is active on the first RAT link, to delay scheduling the uplink data transmissions by a time period of specific duration.

In some embodiments, a method for improved coexistence of multiple wireless RAT communications in a device includes providing, by a first RAT controller, information to a second RAT controller about active data transfer periods of a first RAT link, based on a data transmission mechanism of defined data transfer periodicity governing data transfer over the first RAT link, and scheduling, by the second RAT controller, data transfer over a second RAT link, based on the received information about the active data transfer periods of the first RAT link.

In some embodiments, a UE device includes a radio having one or more antennas for performing wireless communication according to at least a first RAT and a second RAT, a first controller for at least partially managing wireless communication of the UE according to the first RAT, and a second controller for at least partially managing wireless communication of the UE according to the second RAT. The first controller may operate to provide information to the second controller about active data transfer periods of a first RAT link, based on a data transmission mechanism of defined data transfer periodicity governing data transfer over the first RAT link, and the second controller may operate to schedule data transfer over a second RAT link, based on the received information about the active data transfer periods of the first RAT link.

In some embodiments, a device includes means for providing information about active data transfer periods of a first RAT link, based on a data transmission mechanism of defined data transfer periodicity governing data transfer over the first RAT link, and further includes means for scheduling data transfer over a second RAT link, based on the received information about the active data transfer periods of the first RAT link.

In some embodiments, a non-transitory memory element (NME) stores instructions executable by processing circuitry to cause a wireless communication device to provide information about active data transfer periods of a first RAT link, based on a data transmission mechanism of defined data transfer periodicity governing data transfer over the first RAT link. The instructions may further be executable to cause the wireless communication device to schedule data transfer over a second RAT link, based on the provided information about the active data transfer periods of the first RAT link.

In some embodiments, a method for improved coexistence of multiple wireless RAT communications in a wireless communication device include suppressing, by a first RAT controller at the end of a defined first active data transfer period, uplink scheduling requests for a configurable time period, where the uplink scheduling requests are associated with data transfer over a first RAT link. The method may further include the first RAT controller sending to a second RAT controller a first message indicative of a beginning and duration of an inactivity period corresponding to the configurable time period. The method may also include the second RAT controller beginning data transfer over a second RAT link at the beginning of the inactivity period, and the first RAT controller sending to the second RAT controller advance notification that transmission will begin over the first RAT link at a specific time. Finally, the method may include the second RAT controller ending the data transfer over the second RAT link at the end of the inactivity period, responsive to receiving the advance notification, and the first RAT controller sending a scheduling request to a base station, and beginning a second active data transfer period over the first RAT link.

In some embodiments, a UE device may include a radio having one or more antennas for performing wireless communication according to at least a first RAT and a second RAT, a first controller for at least partially managing wireless communication of the UE according to the first RAT, and a second controller for at least partially managing wireless communication of the UE according to the second RAT. The first controller may suppress for a configurable time period, at the end of a defined first active period, uplink scheduling requests associated with data transfer over a first RAT link. The first controller may also send to the second controller a first message indicative of a beginning and duration of an inactivity period corresponding to the configurable time period, and the second controller may begin data transfer over a second RAT link at the beginning of the inactivity period. The first controller may also send to the second RAT controller advance notification that transmission will begin over the first RAT link at a specific time, and the second controller may end the data transfer over the second RAT link at the end of the inactivity period, responsive to receiving the advance notification. Finally, the first controller may send a scheduling request to a base station, and begin a second active data transfer period over the first RAT link.

In some embodiments, a device may include means for suppressing at the end of a defined first active data transfer period, uplink scheduling requests for a configurable time period, where the uplink scheduling requests are associated with data transfer over a first RAT link, means for providing first information indicative of a beginning and duration of an inactivity period corresponding to the configurable time period, means for beginning data transfer over a second RAT link at the beginning of the inactivity period responsive to the first information, means for providing advance notification that transmission will begin over the first RAT link at a specific time, means for ending the data transfer over the second RAT link at the end of the inactivity period, responsive to the advance notification, and means for sending a scheduling request to a base station, and beginning a second active data transfer period over the first RAT link.

In some embodiments, a non-transitory memory element (NME) may store instructions executable by processing circuitry to cause a wireless communication device to suppress at the end of a defined first active data transfer period, uplink scheduling requests for a configurable time period, where the uplink scheduling requests are associated with data transfer over a first RAT link, provide first information indicative of a beginning and duration of an inactivity period corresponding to the configurable time period, begin data transfer over a second RAT link at the beginning of the inactivity period responsive to the first information, provide advance notification that transmission will begin over the first RAT link at a specific time, end the data transfer over the second RAT link at the end of the inactivity period, responsive to the advance notification, and send a scheduling request to a base station, and begin a second active data transfer period over the first RAT link.

In some embodiments, a method for improved coexistence of multiple wireless RAT communications in a wireless communication device includes managing time sharing between wireless communications of a wireless device conducted according to a first RAT and wireless communications of the wireless device conducted according to a second RAT. The time sharing management may include providing, by a first RAT controller managing the wireless communications of the wireless device conducted according to the first RAT, information to a second RAT controller managing the wireless communications of the wireless device conducted according to the second RAT. Providing the information may include transmitting the information using a first type of messaging with indexes determined according to at least one of:
  status information of a data transmission mechanism of defined data transfer periodicity governing communications conducted according to the first RAT, or
  status information of a radio resource control (RRC) connection of the wireless device.
Providing the information may include providing information about active data transfer periods that occur during communications conducted according to the first RAT and based on the data transmission mechanism, and the method may further include the second RAT controller scheduling data transfer during communications conducted according to the second RAT, based on the received information about the active data transfer periods.

In some embodiments, a UE device may include a radio having one or more antennas for performing wireless communication according to at least a first RAT and a second RAT, and may further include a first controller for at least partially managing wireless communication of the UE according to the first RAT, and a second controller for at least partially managing wireless communication of the UE according to the second RAT. The first controller may provide information to the second controller by transmitting the information using a first type of messaging with indexes determined according to at least one of:
  status information of a data transmission mechanism of defined data transfer periodicity governing communications over the first RAT; or
  status information of a radio resource control (RRC) connection of the wireless device.
The information may include information about active data transfer periods of a first RAT link that occur according to the data transmission mechanism, and the second may schedule data transfer over a second RAT link, based on the received information about the active data transfer periods of the first RAT link.

In some embodiments, a wireless communication device may include means for providing, to a controller managing wireless communications of the wireless device over a second RAT link, information regarding wireless communications conducted by the wireless device over a first RAT link. Providing the information may include transmitting the information using a first type of messaging with indexes determined according to at least one of:
  status information of a data transmission mechanism of defined data transfer periodicity governing communications conducted by the wireless device over the first RAT link; or
  status information of a radio resource control (RRC) connection of the wireless device.
The information may include information about active data transfer periods of the first RAT link that occur according to the data transmission mechanism. the wireless communication device may further include means for scheduling data transfer over the second RAT link, based on the received information about the active data transfer periods of the first RAT link.

In some embodiments, a non-transitory memory element (NME) may store instructions executable by processing circuitry to cause a wireless communication device to provide, to a controller managing wireless communications of the wireless device over a second RAT link, information regarding wireless communications conducted by the wireless device over a first RAT link. Providing the information may include transmitting the information using a first type of messaging with indexes determined according to at least one of:
  status information of a data transmission mechanism of defined data transfer periodicity governing communications conducted by the wireless device over the first RAT link; or
  status information of a radio resource control (RRC) connection of the wireless device.
Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, an apparatus may include a processing element configured to cause a wireless communication device to generate a notification of an expected data transmission pattern allocated by a data transfer mechanism for first communications performed by the wireless communication device according to a first radio access technology (RAT). The processing element may also cause the wireless communication device to have an algorithm to be executed responsive to the notification, where the execution of the algorithm causes second communications performed by the wireless communication device according to a second RAT to be performed based on the expected data transmission pattern.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless communication device comprising:
one or more antennas;
radio circuitry coupled to the one or more antennas and configured to facilitate wireless communications of the wireless communication device over the one or more antennas according to a first radio access technology (RAT) and a second RAT;
a first RAT controller configured to control first communications of the wireless communication device performed according to the first RAT; and
a second RAT controller configured to control second communications of the wireless communication device performed according to the second RAT;
wherein the first RAT controller is configured to notify the second RAT controller of an expected data transmission pattern allocated by a data transfer mechanism for the first communications; and
wherein responsive to being notified by the first RAT controller, the second RAT controller is configured to transmit an interface report to an access point device operating according to the second RAT to cause an algorithm to be executed, wherein the access report indicates when the wireless communication device intends to transmit data according to the first RAT, wherein execution of the algorithm causes the second communications to be performed based on the expected data transmission pattern.

2. The wireless communication device of claim 1, wherein execution of the algorithm causes the second RAT controller to prevent the access point device operating according to the second RAT from sending packets to the wireless communication device when the wireless communication device is transferring data according to the first RAT.

3. The wireless communication device of claim 1, wherein the wireless communication device is configured to receive downlink data according to downlink transmission coordinated by the access point device based on the interface report.

4. The wireless communication device of claim 1, wherein the algorithm is executed by the access point device.

5. The wireless communication device of claim 1, wherein the first RAT controller is configured to provide information to the second RAT controller when notifying the second RAT controller of the expected data transmission pattern, wherein the information is about active data transfer periods that take place during the first communications.

6. The wireless communication device of claim 5, wherein the second RAT controller is configured to schedule data transfers for the second communications based on the information provided by the first RAT controller.

7. The wireless communication device of claim 1, wherein:
the first communications are conducted during defined ON periods, wherein the second communications are not conducted during the defined ON periods; and
the first communications are not conducted during defined OFF periods, wherein the second communications are conducted during the defined OFF periods.

8. An apparatus comprising:
a processing element configured to cause a wireless communication device to:
provide information about active data transfer periods that occur during first communications, wherein the first communications are conducted by the wireless communication device according to a first radio access technology (RAT);
transmit an interface report to an access point device operating according to a second RAT, wherein the access report indicates when the wireless communication device intends to transmit data according to the first RAT; and
wherein the access point device receiving and using the interface report causes second communications conducted by the wireless communication device according to
a second RAT to be performed based at least on the information.

9. The apparatus of claim 8, wherein the processing element is further configured to cause the wireless communication device to conduct the first communications while the second communications are not conducted, and conduct the second communications while the first communications are not conducted.

10. The apparatus of claim 8, wherein the first RAT is Long Term Evolution and the second RAT is Wi-Fi.

11. The apparatus of claim 8, wherein the first communications comprise connected-mode discontinuous reception (C-DRX) communications.

12. The apparatus of claim 8, wherein the processing element is further configured to cause the wireless communication device to:
provide the information from a first RAT controller configured to at least partially control the first communications, to a second RAT controller configured to at least partially control the second communications.

13. The apparatus of claim 8, wherein:
the first communications are conducted during defined ON periods, wherein the second communications are not conducted during the defined ON periods; and
the first communications are not conducted during defined OFF periods, wherein the second communications are conducted during the defined OFF periods.

14. The apparatus of claim 8, wherein:
the first communications are conducted during defined ON periods, wherein the second communications are not conducted during the defined ON periods;
at least portions of the first communications are conducted during defined extended OFF periods when no portions of the second communications are conducted during the defined extended OFF periods; and
at least portions of the second communications are conducted during the defined extended OFF periods when no portions of the first communications are conducted during the defined extended OFF periods.

15. A non-volatile memory element storing instructions executable by a processing element to cause a wireless communications device to:
generate a notification of an expected data transmission pattern allocated by a data transfer mechanism for first communications performed by the wireless communication device according to a first radio access technology (RAT);
transmit an interface report to an access point device operating according to a second RAT, wherein the access report indicates when the wireless communication device intends to transmit data according to the expected data transmission pattern;
wherein the access point device receiving the interface report causes an algorithm to be executed, wherein execution of the algorithm causes second communications performed by the wireless communication device according to the second RAT to be performed based on the expected data transmission pattern.

16. The non-volatile memory element of claim 15, wherein the instructions are further executable by the processing element to cause the wireless communication device to:
prevent the access point device from sending packets to the wireless communication device when the wireless communication device is transferring data according to the first RAT.

17. The non-volatile memory element of claim 15, wherein the instructions are further executable by the processing element to cause the wireless communication device to:
receive downlink data according to downlink transmission coordinated by the access point device based on the interface report.

18. The non-volatile memory element of claim 15, wherein the the algorithm is executed in the access point device.

19. The non-volatile memory element of claim 15, wherein the processing element is further configured to cause the wireless communication device to:
provide information, as part of the notification, about active data transfer periods that take place during the first communications.

20. The non-volatile memory element of claim 15, wherein:
the first communications are conducted during defined ON periods, wherein the second communications are not conducted during the defined ON periods; and
the first communications are not conducted during defined OFF periods, wherein the second communications are conducted during the defined OFF periods.

* * * * *